US009721346B2

(12) United States Patent
Masuda

(10) Patent No.: US 9,721,346 B2
(45) Date of Patent: Aug. 1, 2017

(54) IMAGE ASSESSMENT DEVICE, METHOD, AND COMPUTER READABLE MEDIUM FOR 3-DIMENSIONAL MEASURING AND CAPTURING OF IMAGE PAIR RANGE

(71) Applicant: FUJIFILM Corporation, Tokyo (JP)

(72) Inventor: Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 74 days.

(21) Appl. No.: 14/832,557

(22) Filed: Aug. 21, 2015

(65) Prior Publication Data
US 2015/0356739 A1 Dec. 10, 2015

Related U.S. Application Data

(63) Continuation of application No. PCT/JP2013/078803, filed on Oct. 24, 2013.

(30) Foreign Application Priority Data

Mar. 12, 2013 (JP) .................................. 2013-049445

(51) Int. Cl.
*G06T 7/00* (2017.01)
*G06T 17/05* (2011.01)
(Continued)

(52) U.S. Cl.
CPC .......... *G06T 7/0075* (2013.01); *G01B 11/245* (2013.01); *G01C 11/06* (2013.01);
(Continued)

(58) Field of Classification Search
CPC ..... G01C 11/06; G01B 11/245; G06T 7/0075; G06T 17/05; G06T 7/004; H04N 13/0242; H04N 13/0271
See application file for complete search history.

(56) References Cited

U.S. PATENT DOCUMENTS 6,618,497 B1 * 9/2003 Nakayama ............ G01C 11/06
382/154
2007/0263924 A1 * 11/2007 Kochi ..................... G01B 11/24
382/154
(Continued)

FOREIGN PATENT DOCUMENTS

JP 8-254424 A 10/1996
JP 10-019562 A 1/1998
(Continued)

OTHER PUBLICATIONS

Ullman, Shimon. "Three-dimensional object recognition based on the combination of views." Cognition 67.1 (1998): 21-44.*
(Continued)

*Primary Examiner* — Edward Park
*Assistant Examiner* — Pinalben Patel
(74) *Attorney, Agent, or Firm* — Birch, Stewart, Kolasch & Birch, LLP

(57) ABSTRACT

The present invention provides an image assessment device capable of accurately and promptly assessing an image pair used for 3D measurement from plural captured images. An image assessment device according to the invention includes first captured image selection device, first captured image information acquisition device, object distance to-be-measured acquisition device, object position to-be-measured calculation device, second captured image selection device, second captured image information acquisition device, imaging range calculation device, and assessment device that determines whether or not a calculated object position to be measured is within a calculated imaging range, and assesses that a first captured image and a second captured image are of an image pair if determining that the calculated object position to be measured is within the calculated imaging range.

16 Claims, 17 Drawing Sheets

(51) Int. Cl.
  *H04N 13/02* (2006.01)
  *G01C 11/06* (2006.01)
  *G01B 11/245* (2006.01)
  *G06T 7/593* (2017.01)

(52) U.S. Cl.
  CPC .............. *G06T 7/593* (2017.01); *G06T 17/05* (2013.01); *H04N 13/0271* (2013.01); *H04N 13/0242* (2013.01)

(56) References Cited

U.S. PATENT DOCUMENTS

| | | | |
|---|---|---|---|
| 2009/0161946 A1 | 6/2009 | Sato et al. | |
| 2009/0175497 A1 | 7/2009 | Anai et al. | |
| 2009/0175498 A1 | 7/2009 | Kochi et al. | |
| 2009/0268214 A1 | 10/2009 | Lucic et al. | |
| 2011/0096957 A1* | 4/2011 | Anai | G01C 11/10 382/106 |

FOREIGN PATENT DOCUMENTS

| | | |
|---|---|---|
| JP | 2001-004373 A | 1/2001 |
| JP | 2001-317915 A | 11/2001 |
| JP | 2007-327938 A | 12/2007 |
| JP | 2009-014628 A | 1/2009 |
| JP | 2009-014629 A | 1/2009 |
| JP | 2009-150848 A | 7/2009 |
| JP | 2009-186287 A | 8/2009 |
| JP | 2012-124554 A | 6/2012 |
| JP | 2012-234374 A | 11/2012 |
| WO | WO 2007/137388 A | 12/2007 |

OTHER PUBLICATIONS

International Preliminary Report on Patentability and Written Opinion of the International Searching Authority, with an English translation, dated Sep. 24, 2015, for International Application No. PCT/JP2013/078803.
International Search Report issued in PCT/JP2013/078803, mailed on Jan. 21, 2014.
Shida et al., "Image-Based Modeling of Urban Buildings from Camera Views with GPS, Compass and Clinometers", Information Processing Society of Japan, vol. 2010-CG-141, No. 10, Nov. 9, 2010, pp. 1-6.
Written Opinion issued in PCT/JP2013/078803, mailed on Jan. 21, 2014.

* cited by examiner

IMAGE ASSESSMENT DEVICE, METHOD, AND COMPUTER READABLE MEDIUM FOR 3-DIMENSIONAL MEASURING AND CAPTURING OF IMAGE PAIR RANGE

CROSS-REFERENCE TO RELATED APPLICATIONS

This application is a Continuation of PCT International Application No. PCT/JP2013/078803 filed on Oct. 24, 2013, which claims priority under 35 U.S.C. §119(a) to Japanese Patent Application No. 2013-049445 filed on Mar. 12, 2013. Each of the above application(s) is hereby expressly incorporated by reference, in its entirety, into the present application.

BACKGROUND OF THE INVENTION

Field of the Invention

The present invention relates to a technology concerning three-dimensional (3D) measurement, and particularly relates to a technology for assessing an image pair used for 3D measurement from plural captured images.

Description of the Related Art

There has been known a method for performing 3D measure in which an imaging position is moved relatively to an object to be measured to acquire plural captured images by a capturing device and an image pair is made using the plural captured images (motion stereo method). In the motion stereo method, if the object to be measured is large, the 3D measure is hard to perform with only one image pair in some cases. Examples of the method of the 3D measurement for the object to be measured that is a large one like this include a method in which the 3D measurement is performed by making plural image pairs and synthesizing 3D data made from the respective image pairs to create one piece of large 3D data.

In the case of making the plural image pairs from the plural captured images, if a man/woman grasps the image pair and information on the image pair grasped by the man/woman is processed by software, work is troublesome and the image pair is likely to be erroneously selected.

Japanese Patent Application Laid-Open No. 2009-014629 (hereinafter referred to as PTL 1) describes a technology in which a captured image includes a plurality of frames, and a feature point of an object to be imaged (considered to correspond to the object to be measured in the present invention application) in the captured image is tracked to determine true or false of a stereo pair (considered to correspond to the image pair in the present invention application) on the basis of a vertical parallax for the feature point.

Japanese Patent Application Laid-Open No. 2009-014628 (hereinafter referred to as PTL 2) describes a technology in which a captured image includes a plurality of frames, and a feature point of an object to be imaged in the captured image is tracked to determine true or false of a corresponding point corresponding to the feature point and select a stereo pair.

Japanese Patent Application Laid-Open No. 2012-124554 (hereinafter referred to as PTL 3) describes a technology in which capturing is controlled via a CPU or the like to acquire a pair of images while azimuth information and posture information of a camera obtained from an azimuth sensor and acceleration sensor are displayed on a liquid crystal panel to support capturing carried out by a user in a state where an optical axis direction and a posture condition in a horizontal direction between two images are not relatively deviated.

Japanese Patent Application Laid-Open No. 2001-317915 (hereinafter referred to as PTL 4) discloses a technology relating to 3D measuring device which includes capturing means for imaging a measured object, first feature point specifying means for specifying a feature point on an image in which the measured object is captured by the capturing means, distance measurement means for measuring a distance to the feature point on the measured object specified by the feature point specifying means, second feature point specifying means for specifying a point on the measured object corresponding to a feature point on an image in which the measured object is captured at a first imaging position as a feature point on an image in which the measured object is captured at a second imaging position by the capturing means, and arithmetic means for finding a relative position and angle between the first imaging position and the second imaging position from the feature points on the images in which the measured object is captured at the first imaging position and the second imaging position and the distances to the feature points measured at the imaging positions by the distance measurement means.

SUMMARY OF THE INVENTION

However, in the technologies described in PTLs 1 and 2, since the stereo pair is selected on the basis of the feature point of the object to be imaged in the plural captured images, if the feature point of the object to be imaged is erroneously determined, disadvantageously the stereo pair may be erroneously determined. For example, in a case where the object to be measured is a building, if an identical shape continues like a window or the like, the corresponding point corresponding to the feature point may be erroneously determined in some cases.

In the technologies described in PTLs 3 and 4, no description is provided regarding selection of one pair of images from the plural captured images.

The present invention has been made in consideration of such a circumstance, and has an object to provide an image assessment device capable of accurately and promptly assessing an image pair used for 3D measurement from plural captured images, a capturing device, a 3D measuring device, an image pair assessment method and a program.

In order to achieve the above object, an image assessment device according to an aspect of the invention is an image assessment device assessing an image pair used for 3D measurement from plural captured images including first captured image selection device that selects a first captured image from the plural captured images, a first captured image information acquisition device that acquires an imaging position and imaging orientation of the selected first captured image, an object distance to-be-measured acquisition device that acquires an object distance to be measured from a first imaging position that is the imaging position for the first captured image to an object to be measured in the first captured image, an object position to-be-measured calculation device that calculates an object position to be measured which is a position on an optical axis in capturing the first captured image and is at the object distance to be measured in a 3D space from the first imaging position, a second captured image selection device that selects a second captured image from the plural captured images, a second captured image information acquisition device that acquires a second imaging position that is an imaging position, imaging orientation, and angle of view for the selected second captured image, an imaging range calculation device that calculates an imaging range corresponding to the second captured image on the basis of the imaging position, imaging orientation, and angle of view for the selected second captured image, and an assessment device that determines whether or not the calculated object position to be measured is within the calculated imaging range, and assesses that the first captured image and the second captured image are of the image pair if determining that the calculated object position to be measured is within the calculated imaging range.

This makes it possible to accurately and promptly assess the image pair used for the 3D measurement from the plural captured images.

In the image assessment device, it is preferable that the assessment device assesses that the first captured image and the second captured image are of the image pair, further in a case where a value of a resolving power ΔZ is equal to or less than a threshold, the resolving power ΔZ being expressed by [Formula 1] below including a base length L between a capturing device at the first imaging position and a capturing device at the second imaging position.

$$\Delta Z = \frac{Z^2}{(f/p) \times L} \quad \text{[Formula 1]}$$

ΔZ: resolving power
Z: object distance to be measured
f: focal length
p: pixel pitch of an image pickup device in the capturing device which acquires the captured image
L: base length between the capturing device at the first imaging position and the capturing device at the second imaging position.

This allows assessment of the image pair having higher resolving power more suitable in terms of the 3D measurement, increasing accuracy of the 3D measurement.

In the image assessment device, it is preferable that the assessment device assesses that the first captured image and the second captured image are of the image pair, further in a case where an angle α formed by the meeting of an optical axis of the capturing device at the first imaging position with a straight line C which connects the capturing device at the first imaging position to the capturing device at the second imaging position, and an angle β formed by the meeting of an optical axis of the capturing device at the second imaging position with the straight line C are both 45° or more and 135° or less.

This allows selection of the image pair more suitable in terms of the 3D measurement with an arrangement, proper for the 3D measurement, of the capturing device capturing the first captured image and the capturing device capturing the second captured image.

In the image assessment device, it is preferable that the assessment device assesses that the first captured image and the second captured image are of the image pair, further in a case a distance S between the object position to be measured and the optical axis of the capturing device at the imaging position for the second captured image is equal to or less than a threshold.

This allows selection of the image pair having larger overlapped area of the first captured image and the second captured image, leading to selection of the image pair more suitable in terms of the 3D measurement.

In the image assessment device, it is preferable that the second captured image selection device selects a captured image having a value of a resolving power ΔZ equal to or less than a threshold as the second captured image, the resolving power ΔZ being expressed by [Formula 2] below including a base length Lx between a capturing device at the first imaging position and a capturing device at an imaging position for a single captured image of the plural captured images.

$$\Delta Z = \frac{Z^2}{(f/p) \times Lx} \quad \text{[Formula 2]}$$

ΔZ: resolving power
Z: object distance to be measured
f: focal length
p: pixel pitch of an image pickup device in the capturing device which acquires the captured image
Lx: base length between the capturing device at the first imaging position and the capturing device at the imaging position for the single captured image of the plural captured images.

This allows assessment of the image pair having higher resolving power more suitable in terms of the 3D measurement, increasing accuracy of the 3D measurement. Additionally, the second captured image selection unit 110 selects the captured image having the value of the resolving power ΔZ equal to or less than the threshold, reducing extra calculation after the second captured image is selected.

In the image assessment device, it is preferable that further in a case where an angle α formed by meeting of an optical axis of the capturing device at the first imaging position with a straight line which connects the capturing device at the first imaging position to the capturing device at the imaging position for the single captured image of the plural captured images, and an angle β formed by meeting of an optical axis of the capturing device at the imaging position for the single captured image of the plural captured images with the straight line are both 45° or more and 135° or less, the second captured image selection device selects the single captured image as the second captured image.

This allows selection of the image pair more suitable in terms of the 3D measurement with an arrangement, proper for the 3D measurement, of the capturing device capturing the first captured image and the capturing device capturing the second captured image. Additionally, the second captured image selection unit 110 selects the captured image with taking into account values of the angle α and the angle β, reducing extra calculation after the second captured image is selected.

In the image assessment device, it is preferable that further in a case where a distance S between the object position to be measured and the optical axis of the capturing device at the imaging position for the single captured image of the plural captured images is equal to or less than the threshold, the second captured image selection device selects the single captured image as the second captured image.

This allows selection of the image pair having larger overlapped area of the first captured image and the second captured image, leading to selection of the image pair more suitable in terms of the 3D measurement. Additionally, the second captured image selection unit 110 selects the captured image with taking into account values of the angle α and the angle β, reducing extra calculation after the second captured image is selected.

In the image assessment device, it is preferable that the first captured image selection device selects any captured image as the first captured image from the plural captured images, and the second captured image selection device selects any captured image of the captured images other than the first captured image as the second captured image from the plural captured images.

This allows the assessment of the image pair in the plural captured images without omission, which makes it possible to create more image pairs, leading to more accurate 3D measurement.

It is preferable that the image assessment device further includes a storage device that stores therein a plurality of the image pairs assessed by the assessment device, and a resolving power optimal pair assessment device that assesses that a pair having the highest resolving power $\Delta Z$ is a resolving power optimal pair from a pair group, the pair being included in the pair group in which the first captured image or the second captured image of the image pair is identical in the plurality of the image pairs stored in the storage device.

This allows selection of the image pair having the highest resolving power $\Delta Z$, leading to more accurate 3D measurement.

It is preferable that the image assessment device further includes a storage device that stores therein a plurality of the image pairs assessed by the assessment device, and a distance S optimal pair assessment device that assesses that a pair having the shortest distance S is a distance S optimal pair from a pair group, the pair being included in the pair group in which the first captured image or the second captured image of the image pair is identical in the plural image pairs stored in the storage device.

This allows selection of the pair having the shortest distance S, leading to more accurate 3D measurement.

In the image assessment device, it is preferable that the storage device stores as one file the image pair assessed by the assessment device.

In the image assessment device, it is preferable that the imaging range calculation device calculates the imaging range shaped in a quadrangular pyramid corresponding to the second captured image on the basis of the imaging position, imaging orientation, and angle of view for the selected second captured image.

In order to achieve the above object, a capturing device according to another aspect of the invention has the image assessment device described above.

In order to achieve the above object, a 3D measuring device according to another aspect of the invention uses the image pair assessed by the image assessment device described above.

In order to achieve the above object, an image assessment device according to another aspect of the invention is an image assessment method for assessing an image pair used for 3D measurement from plural captured images including a first captured image selection step for selecting a first captured image from the plural captured images, a first captured image information acquisition step for acquiring an imaging position and imaging orientation of the selected first captured image, an object distance to-be-measured acquisition step for acquiring an object distance to be measured from a first imaging position that is the imaging position for the first captured image to an object to be measured in the first captured image, an object position to-be-measured calculation step for calculating an object position to be measured which is a position on an optical axis in capturing the first captured image and is at the object distance to be measured in a 3D space from the first imaging position, a second captured image selection step for selecting a second captured image from the plural captured images, a second captured image information acquisition step for acquiring a second imaging position that is an imaging position, imaging orientation, and angle of view for the selected second captured image, an imaging range calculation step for calculating an imaging range shaped in a quadrangular pyramid corresponding to the second captured image on the basis of the imaging position, imaging orientation, and angle of view for the acquired second captured image, and an assessment step for determining whether or not the calculated object position to be measured is within the calculated imaging range, and assesses that the first captured image and the second captured image are of the image pair if determining that the calculated object position to be measured is within the calculated imaging range.

In order to achieve the above object, a program according to another aspect of the invention, a program for assessing an image pair used for 3D measurement from plural captured images, the program causing a computer to execute a first captured image selection step for selecting a first captured image from the plural captured images, a first captured image information acquisition step for acquiring an imaging position and imaging orientation of the selected first captured image, an object distance to-be-measured acquisition step for acquiring an object distance to be measured from a first imaging position that is the imaging position for the first captured image to an object to be measured in the first captured image, an object position to-be-measured calculation step for calculating an object position to be measured which is a position on an optical axis in capturing the first captured image and is at the object distance to be measured in a 3D space from the first imaging position, a second captured image selection step for selecting a second captured image from the plural captured images, a second captured image information acquisition step for acquiring a second imaging position that is an imaging position, imaging orientation, and angle of view for the selected second captured image, an imaging range calculation step for calculating an imaging range shaped in a quadrangular pyramid corresponding to the second captured image on the basis of the imaging position, imaging orientation, and angle of view for the acquired second captured image, and an assessment step for determining whether or not the calculated object position to be measured is within the calculated imaging range, and assesses that the first captured image and the second captured image are of the image pair if determining that the calculated object position to be measured is within the calculated imaging range.

According to the present invention, it is assessed whether or not the first captured image and the second captured image are of the image pair used for the 3D measurement, depending on whether or not the object position to be measured in the 3D space in the first captured image selected from the plural captured images is within the imaging range for the second captured image selected from the plural captured images, which makes it possible to accurately and promptly assess the image pair used for the 3D measurement.

DETAILED DESCRIPTION OF THE PREFERRED EMBODIMENTS

Hereinafter, a description is given of examples according to the invention with reference to the drawings. Note that a term "means" and a term "unit" are used to have the same meaning in the present invention application.

Figure 1:
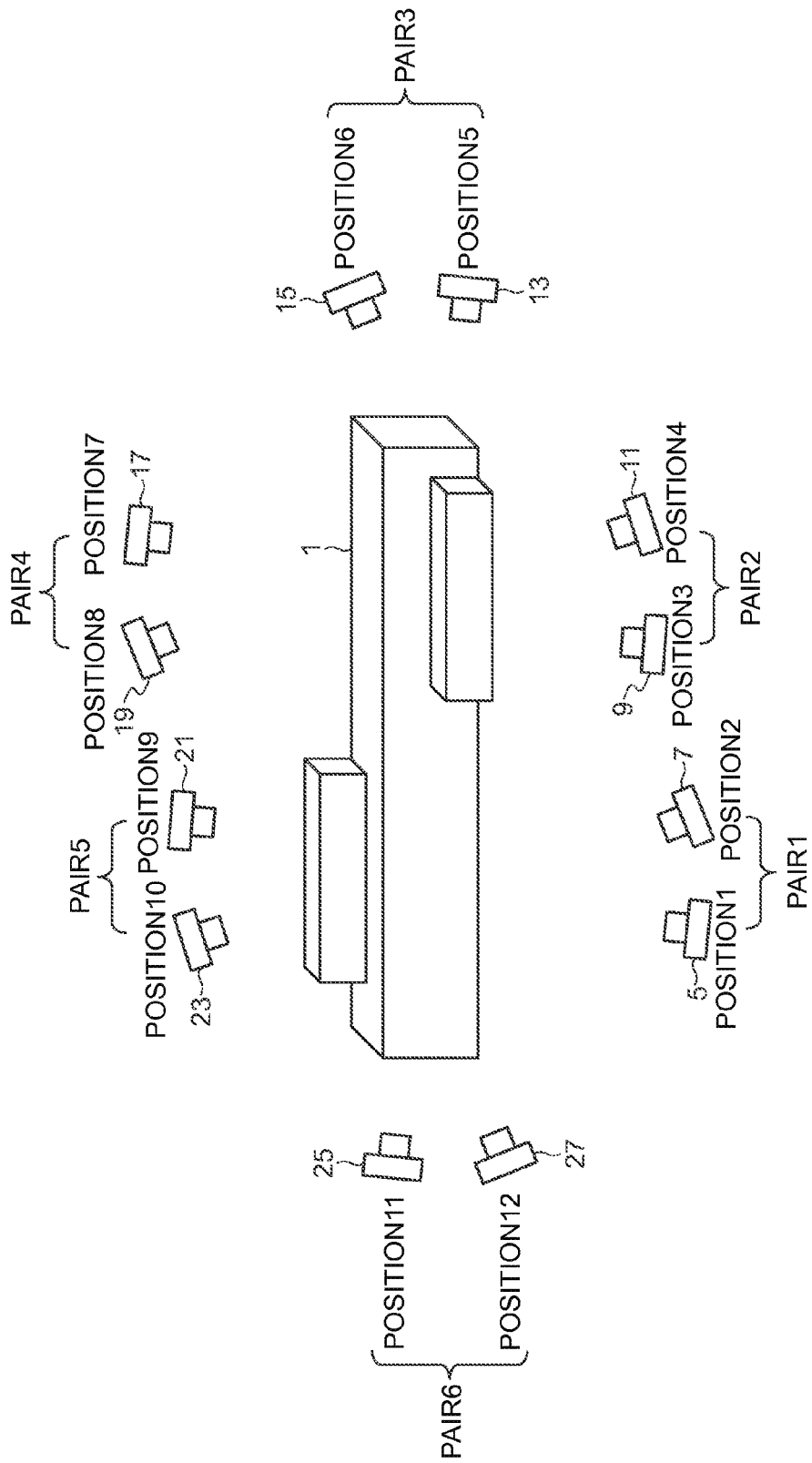
FIG. 1 is an illustration explaining 3D measurement by a stereo method.

FIG. 1 is an illustration explaining a motion stereo method in 3D measurement. FIG. 1 shows an object 1 to be measured, a capturing device 5 at a position 1, a capturing device 7 at a position 2, a capturing device 9 at a position 3, a capturing device 11 at a position 4, a capturing device 13 at a position 5, a capturing device 15 at a position 6, a capturing device 17 at a position 7, a capturing device 19 at a position 8, a capturing device 21 at a position 9, a capturing device 23 at a position 10, a capturing device 25 at a position 11, and a capturing device 27 at a position 12.

In the 3D measurement by the motion stereo method, first, one or more capturing devices are moved relatively to the object 1 to be measured to acquire plural captured images as shown in FIG. 1. Then, an image pair (stereo image pair) is selected from the plural captured images imaged by the capturing devices having a positional relationship like pairs 1 to 6 shown in FIG. 1 (e.g., capturing devices 5 and 7) and 3D data is created on the basis of the image pair to perform the 3D measurement on the object 1 to be measured. Since only one image pair is not sufficient in a case where the object 1 to be measured is large, plural image pairs are acquired as shown in FIG. 1, the three-dimensional (3D) data is synthesized from each of the image pairs to create one large piece of 3D data, and the 3D measurement is performed on the object 1 to be measured.

Moving of the object 1 to be measured relative to the capturing device may be such that the capturing device is moved circumferentially around the object 1 to be measured as shown in FIG. 1 or moved linearly with respect to the object 1 to be measured, as the case may be. Moreover, a single capturing device may acquire the plural captured images or a plurality of capturing devices may acquire the plural captured images, as the case may be.

{Embodiment of Assessment Device}

Figure 2:
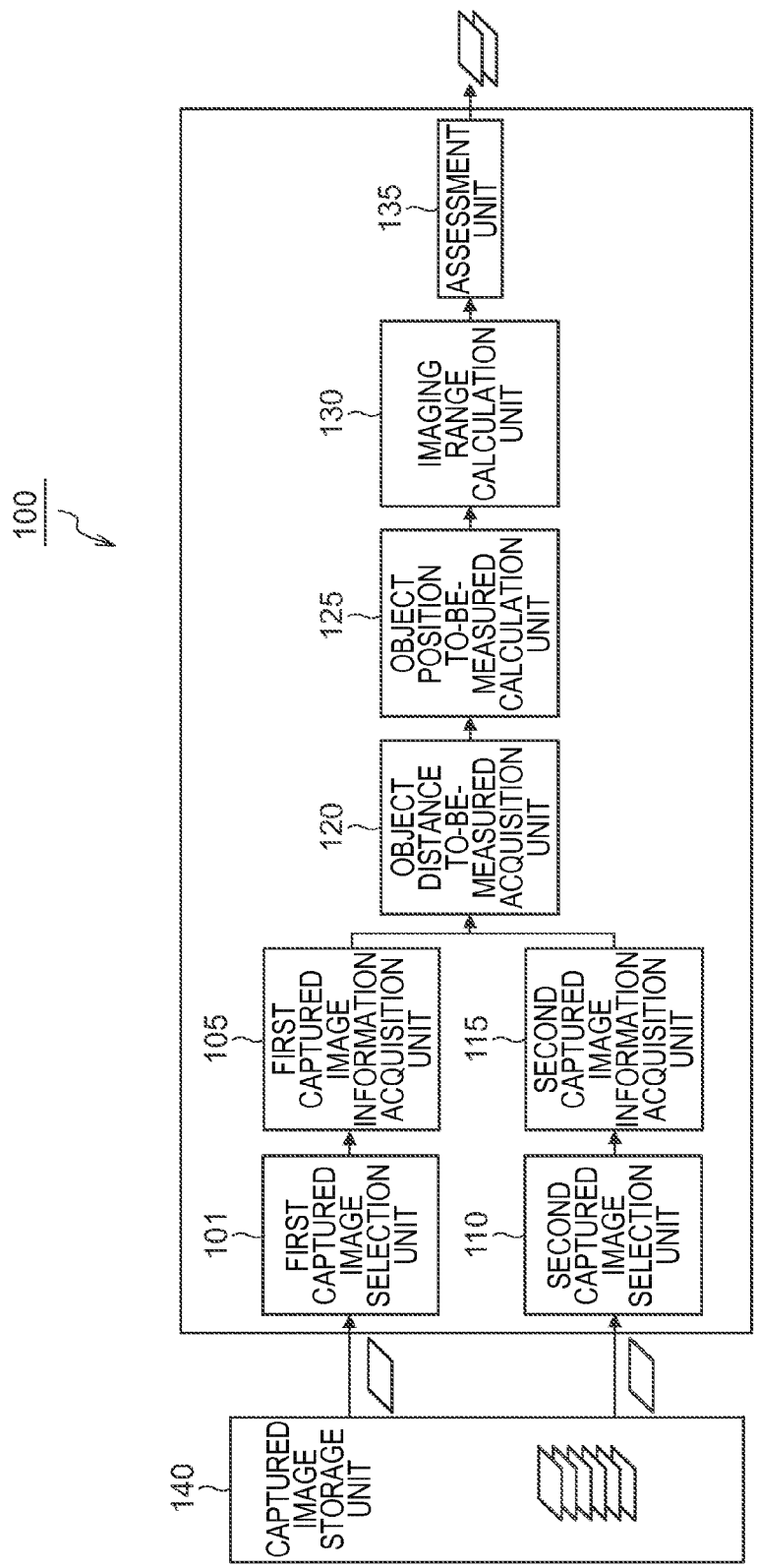
FIG. 2 is a functional block diagram of an image assessment device.

FIG. 2 is a block diagram of an image assessment device according to the invention. The image assessment device 100 includes a first captured image selection unit 101, first captured image information acquisition unit 105, object distance to-be-measured acquisition unit 120, object position to-be-measured calculation unit 125, second captured image selection unit 110, second captured image information acquisition unit 115, imaging range calculation unit 130, and assessment unit 135. The first captured image information acquisition unit 105 and first captured image information acquisition device have the same meaning, and the second captured image information acquisition unit 115 and second captured image information acquisition device have the same meaning.

The first captured image selection unit 101 shown in FIG. 2 selects one sheet of captured image from the plural captured images stored in the captured image storage unit 140 to set that captured image to a first captured image. The method for selecting the first captured image from the plural captured images is not specifically defined. For example, the first captured image may be selected at random from the plural captured images, or the first captured image may be selected from the plural captured images in an order which is decided based on a date and time of capturing the captured image. In FIG. 2, the captured image storage unit 140 is located external to the image assessment device 100, but is not limited thereto. For example, the image assessment device 100 may have the captured image storage unit 140.

The second captured image selection unit 110 shown in FIG. 2 selects one sheet of captured image from the plural captured images stored in the captured image storage unit 140 to set that captured image to a second captured image. Similarly to the first captured image selection unit 101, the method for selecting the second captured image from the plural captured images is not specifically limited. Similarly to the first captured image selection unit 101, various selection methods can be used. Note that the captured image selected as the first captured image cannot be selected as the second captured image at the same time. However, even an image which is once selected as the first captured image or the second captured image can be newly selected as the second captured image. In other words, the first captured image selection unit 101 may select any captured image as the first captured image from the plural captured images, and the second captured image selection unit 110 may select any captured image of the captured images other than the first captured image as the second captured image from the plural captured images.

The first captured image information acquisition unit 105 shown in FIG. 2 acquires information on an imaging position and imaging orientation of the first captured image. Here, the imaging position for the first captured image refers to a position of a capturing device which captured the first captured image in capturing the first captured image. The imaging position for the first captured image in a 3D space may be acquired on the basis of a latitude, longitude, and altitude measured mainly by a GPS (Global Positioning System). The imaging orientation of the first captured image refers to an orientation to which the capturing device is oriented in capturing the first captured image, and mainly refers to a direction of an optical axis. A direction of the imaging orientation of the first captured image (optical axis of the capturing device) may be identified by an electronic compass and a gyro sensor. The electronic compass can identify a direction in an XY plane in the 3D space (pan orientation). The gyro sensor can identify an inclination in a Z-axis direction (tilt orientation). Other measuring instruments may be used so long as they have the same function as the electronic compass and the gyro sensor.

The first captured image information acquisition unit 105 shown in FIG. 2 can acquire the information on the imaging position and imaging orientation of the first captured image by way of various aspects. As an example, an aspect may be employed in which the first captured image has the information on the imaging position and imaging orientation of the first captured image added thereto, and the first captured image information acquisition unit 105 acquires the information on the imaging position and imaging orientation of the first captured image added to the first captured image. As another example, the first captured image information acquisition unit 105 may acquire separately from the first captured image the information on the imaging position and imaging orientation of the first captured image associated with the first captured image, and, for example, the information on the imaging position and imaging orientation of the first captured image may be acquired from outside of the image assessment device.

The second captured image information acquisition unit 115 shown in FIG. 2 acquires information on a second imaging position as an imaging position for the second captured image and on an imaging orientation of a capturing device of the second captured image, in the same manner as the aspect of the first captured image information acquisition unit 105. Further, the second captured image information acquisition unit 115 acquires information on an angle of view in capturing the second captured image.

The second captured image information acquisition unit 115 shown in FIG. 2 acquires the information on the second imaging position, imaging orientation, and angle of view in capturing the second captured image by way of various aspects. As an example, an aspect may be employed in which the second captured image has the information on the second imaging position, imaging orientation, and angle of view in capturing the second captured image added thereto, and the second captured image information acquisition unit 115 acquires the information on the second imaging position, imaging orientation, and angle of view in capturing the second captured image added to the second captured image. As another example, the second captured image information acquisition unit 115 may acquire separately from the second captured image the information on the second imaging position, imaging orientation, and angle of view in capturing the second captured image associated with the second captured image, and, for example, the angle of view in capturing the second captured image may be acquired from outside of the image assessment device. Note that the first captured image selection unit 101, the second captured image selection unit 110, the first captured image information acquisition unit 105, and the second captured image information acquisition unit 115 are separately described in the description in FIG. 2, but one processing circuit may sequentially perform the processes of the respective units.

The object distance to-be-measured acquisition unit 120 shown in FIG. 2 acquires an object distance to be measured from the imaging position for the first captured image to the object 1 to be measured in the first captured image. The object distance to be measured referred to here is an approximate distance from a first imaging position that is the imaging position for the first captured image to an object to be measured at the imaging position. The object distance to be measured may be found by various methods. For example, the object distance to be measured can be found through laser irradiation by a range finder and the like, or the object distance to be measured can be found by manual focusing (MF) or auto focusing (AF). In a case where the distance from the first imaging position to the object 1 to be measured is known in advance, a value of the distance may be used as the object distance to be measured.

Figure 3:
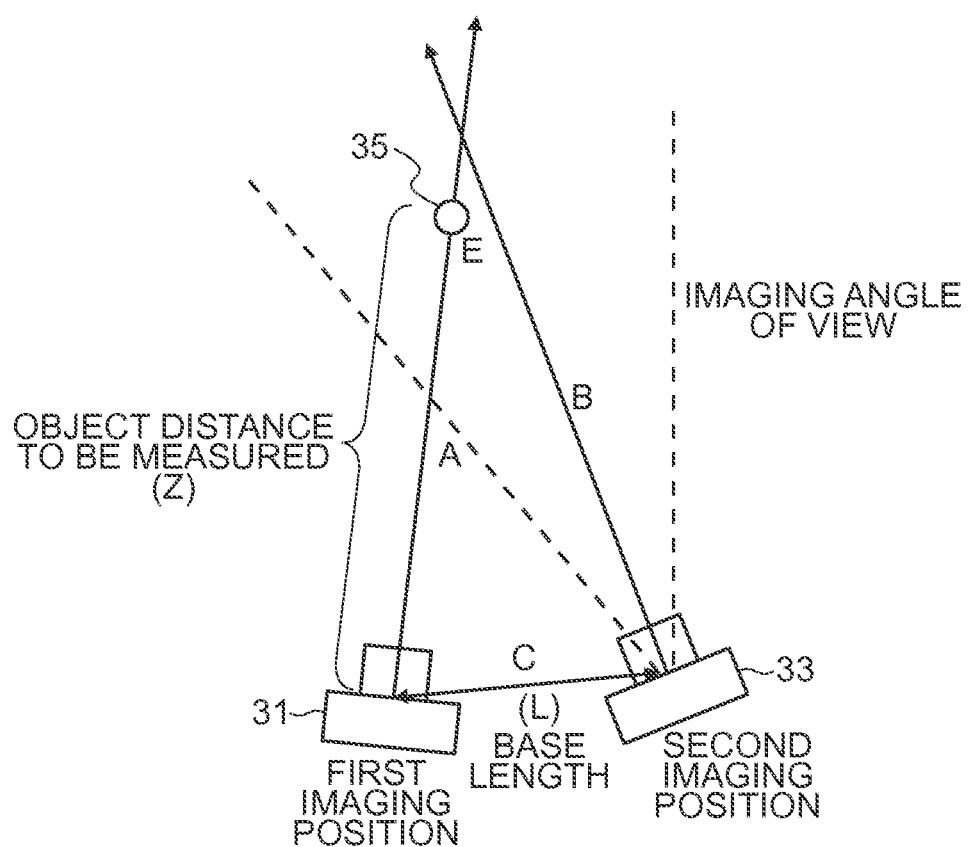
FIG. 3 is a conceptual diagram explaining an object position E to be measured.

The object position to-be-measured calculation unit 125 shown in FIG. 2 calculates an object position E to be measured which is a position on the optical axis in capturing the first captured image and is at the acquired object distance to be measured in the 3D space from the first imaging position that is the imaging position for the first captured image. In FIG. 3, a description is given in detail of a calculation way of the object position E to be measured.

FIG. 3 shows a capturing device 31 for capturing the first captured image at the first imaging position. Also shown is a capturing device 33 for capturing the second captured image at the second imaging position. The optical axis in capturing by the capturing device 31 is shown by a straight line A, and the optical axis in capturing by the capturing device 33 is shown by a straight line B. A straight line connecting the capturing device 31 to the capturing device 33 is shown by a straight line C. An imaging angle of view (imaging range) of the capturing device 33 for capturing the second captured image at the second imaging position is shown by dotted lines. The object position to-be-measured calculation unit 125 calculates an position E (reference numeral 35) as the object position E to be measured which is on the straight line A that is the optical axis in capturing by the capturing device 31 and is at the object distance to be measured from the first imaging position. The object position E to be measured (reference numeral 35) is identified as a position in the 3D space, which may be identified as coordinates of XYZ.

Figure 4:
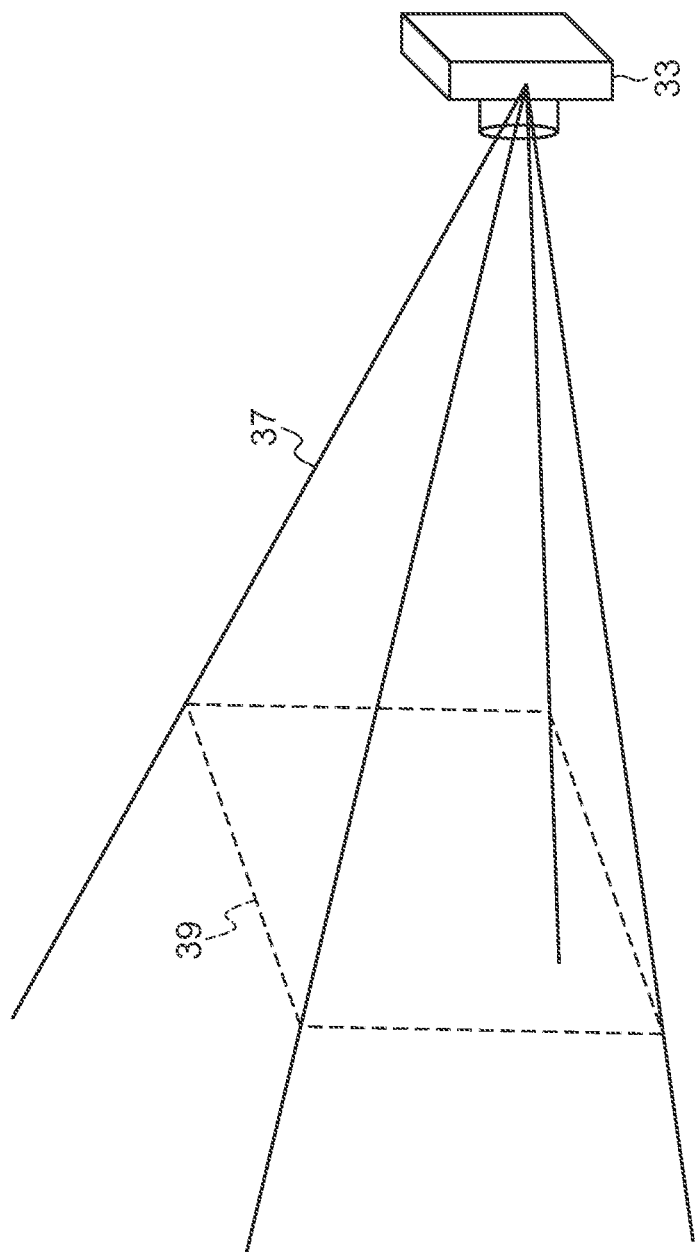
FIG. 4 is an illustration explaining an imaging range corresponding to a second captured image.

The imaging range calculation unit 130 shown in FIG. 2 calculates the imaging range corresponding to the second captured image on the basis of the imaging position, imaging orientation, and angle of view (which is calculated according to a focal length and a size of an image pickup device) of the second captured image acquired by the second captured image information acquisition unit 115. In FIG. 4, a description is given in detail of a calculation way of the imaging range corresponding to the second captured image by the imaging range calculation unit 130.

FIG. 4 shows the capturing device 33 capturing the second captured image, a second captured image 39, and an imaging range 37 shaped in a quadrangular pyramid corresponding to the second captured image 39. The imaging range 37 can be found by use of various known calculation methods. For example, the imaging range can be found from the optical axis of the capturing device 33 at the second imaging position in capturing the second captured image 39 (the straight line B in FIG. 3) and the angle of view in capturing the second captured image 39. The calculated imaging range 37 is not limited to the quadrangular pyramid shape, but may be various shapes.

The assessment unit 135 shown in FIG. 2 determines whether or not the calculated object position E to be measured is within the calculated imaging range 37, and assesses on the basis of a determination result whether or not the first captured image and the second captured image are of the image pair. Specifically, first, determined is whether or not the object position E to be measured described in FIG. 3 is (exists) within the imaging range 37 corresponding to the second captured image 39 described in FIG. 4. Then, if the object position E to be measured is within the imaging range 37 corresponding to the second captured image 39, it is assessed that the first captured image and the second captured image are of the image pair used for the 3D measurement. On the other hand, if the object position E to be measured is not within the imaging range 37 corresponding to the second captured image 39, it is assessed that the first captured image and the second captured image are not of the image pair used for the 3D measurement. As described in FIG. 3, the object position E to be measured is identified by a position in the 3D space (e.g., space coordinates of XYZ). Moreover, as described in FIG. 4, a space area for the imaging range 37 corresponding to the second captured image 39 can be found. Therefore, the assessment unit 135 can determine whether or not the object position E to be measured is within the imaging range 37 corresponding to the second captured image 39.

Figure 5:
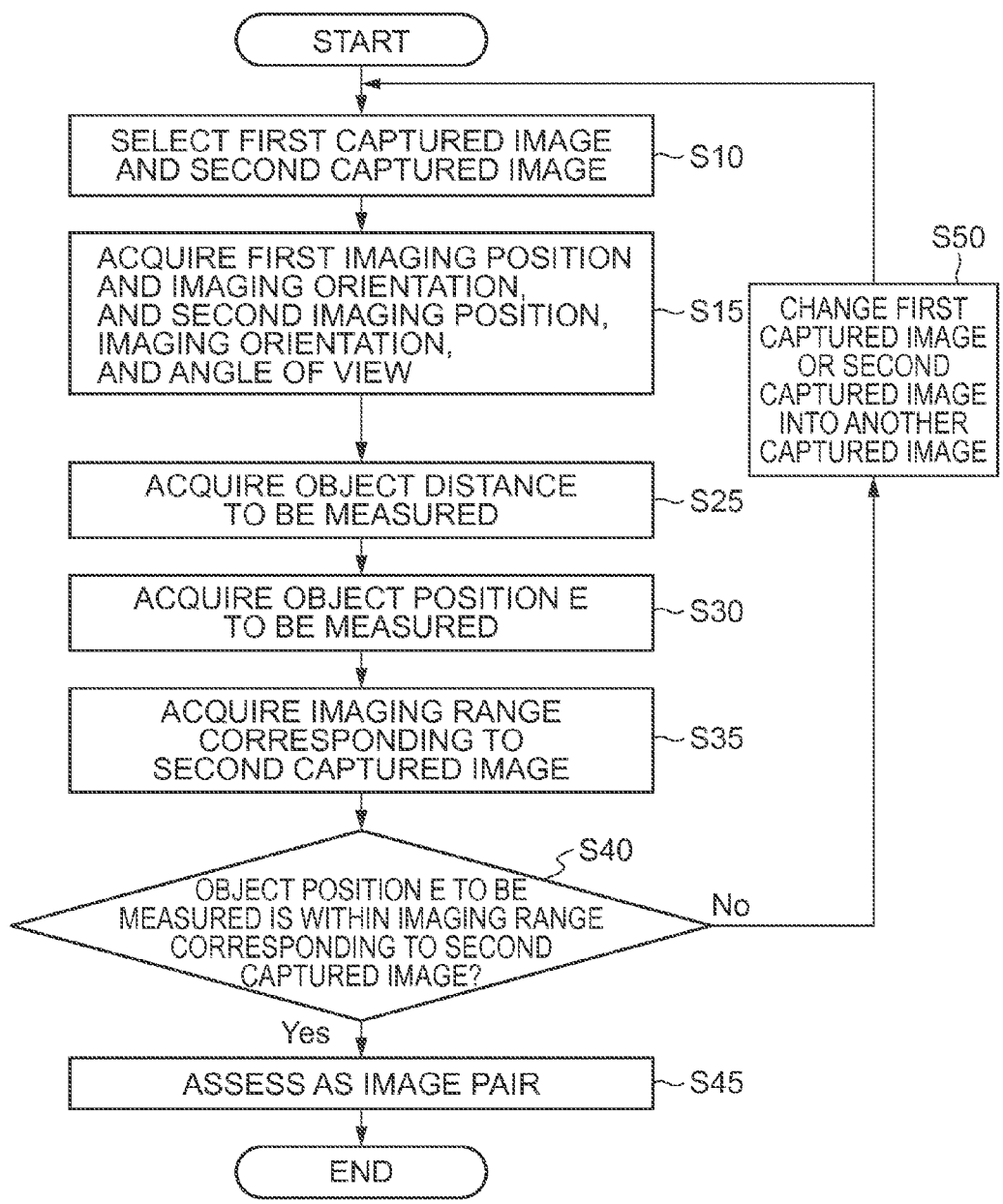
FIG. 5 is a chart illustrating an operation flow of the image assessment device.

FIG. 5 is an operation flow diagram of the image assessment device 100. A description is given of an operation of the image assessment device 100 along FIG. 5. First, the first captured image selection unit 101 selects the first captured image from the plural captured images stored in the captured image storage unit 140 (first captured image selection step), and the second captured image selection unit 110 selects the second captured image from the plural captured images stored in the captured image storage unit 140 (second captured image selection step) (step S10).

Then, the first captured image information acquisition unit 105 acquires the first imaging position and imaging orientation of the first captured image (first captured image information acquisition step), and the second captured image information acquisition unit 115 acquires the second imaging position, imaging orientation, and angle of view of the second captured image (second captured image information acquisition step) (step S15). Further, the object distance to-be-measured acquisition unit 120 acquires the object distance to be measured that is a distance between the first imaging position and the object 1 to be measured (object distance to-be-measured acquisition step) (step S25).

Next, acquired (calculated) is the object position E to be measured which is a position on the optical axis in capturing the first captured image and is at the object distance to be measured in the 3D space from the first imaging position (object position to-be-measured calculation step) (step S30). Then, the imaging range calculation unit 130 acquires (calculates) the imaging range on the basis of the imaging position, imaging orientation, and angle of view of the second captured image (imaging range calculation step) (step S35).

Next, the assessment unit 135 determines whether or not the calculated object position E to be measured is within the calculated imaging range (assessment step) (step S40). If the assessment unit 135 determines that the object position E to be measured is within the imaging range, it is assessed that the first captured image and the second captured image are of the image pair (step S45), and then, one operation flow of the image assessment device 100 ends. On the other hand, if it is determined that the object position E to be measured is not within the imaging range, the first captured image selection unit 101 or the second captured image selection unit 110 is controlled to change the first captured image or the second captured image into another captured image (step S50).

By employing an aspect of the image assessment device according to the invention, it is verified whether or not the object position E to be measured is within the imaging range corresponding to the second captured image, allowing the image pair used for the 3D measurement to be accurately and promptly assessed.

{Capturing Device for Acquiring Captured Image}

The first captured image selection unit 101 and second captured image selection unit 110 in the image assessment device 100 select the first captured image and the second captured image, respectively, from the plural captured images. The plural captured images may be acquired by various capturing devices. The captured image acquired by any capturing device may be used so long as the image assessment device 100 according to the invention can perform the 3D measurement on the captured image.

Figure 6:
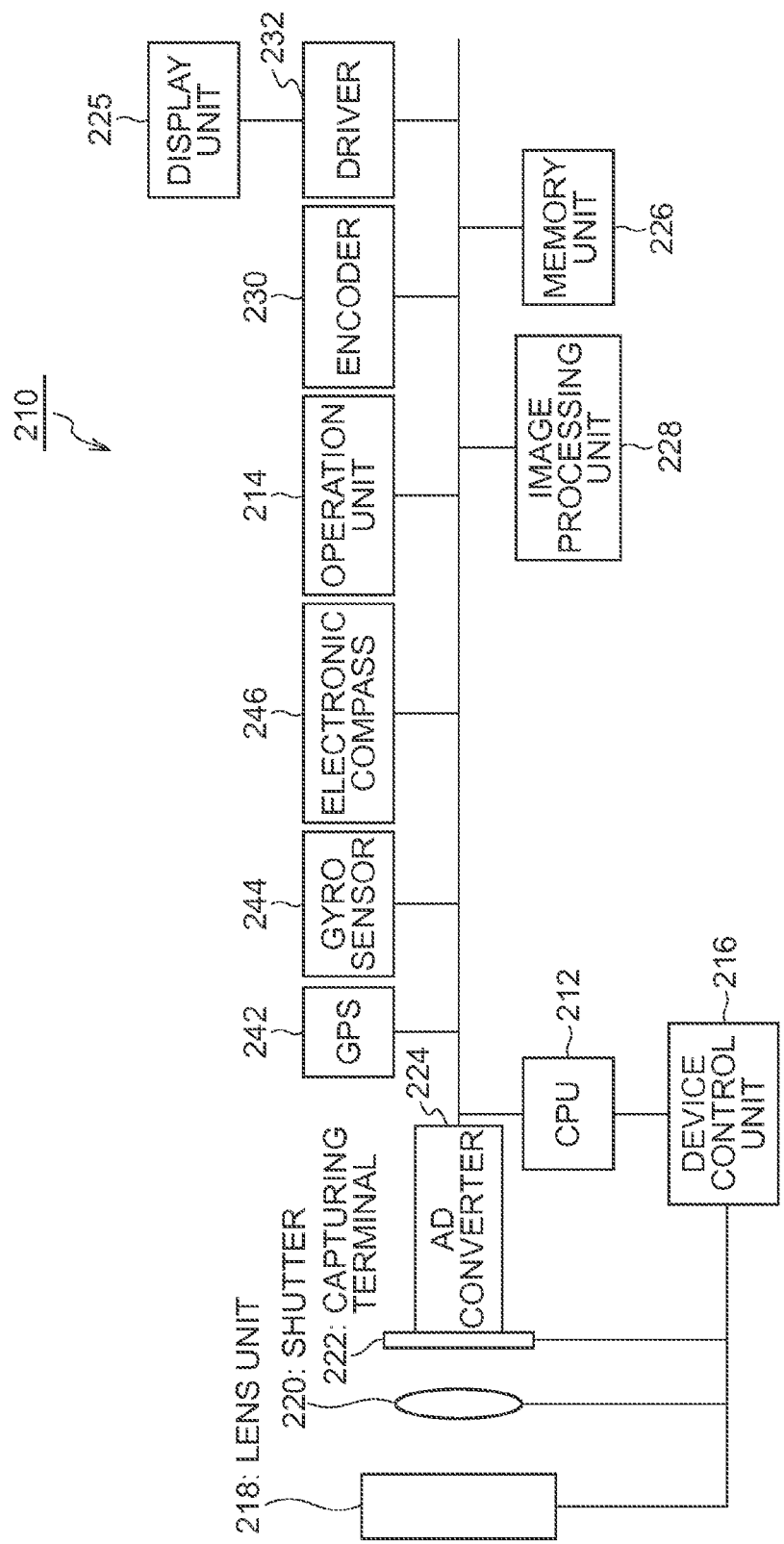
FIG. 6 is a functional block diagram of a capturing device for capturing plural captured images.

FIG. 6 illustrates an example of the capturing device capable of acquiring a captured image usable for the image assessment device 100 according to the invention.

A capturing device 210 shown in FIG. 6 is a digital camera that records the captured image in an internal memory (memory unit 226) or an external record medium (not shown), and operation of the entire device is collectively controlled by the central processing unit (CPU) 212.

The capturing device 210 is provided with an operation unit 214 including a shutter button (shutter switch), mode dial, play button, MENU/OK key, cross-shaped key, zoom button, BACK key and the like. A signal from the operation unit 214 is input to the CPU 212, and the CPU 212 controls each circuit in the capturing device 210 on the basis of the input signal. For example, the CPU 212 controls via a device control unit 216 a lens unit 218, shutter 220, and image pickup device 222 as well as imaging operation (from start of exposure to end of exposure) control, image processing control, image data record/play control, display control of a display unit 225 and the like.

The lens unit 218 includes a focus lens, zoom lens, diaphragm and the like, and a light flux passed through the lens unit 218 and the shutter 220 is formed into an image on a light receiving surface of the image pickup device 222.

The image pickup device 222 which is a color image sensor of a CMOS (Complementary Metal-Oxide Semiconductor) type, XY address type, or CCD (Charge Coupled Device) type has many light receiving elements (photo-diodes) two-dimensionally arranged thereon. A subject image formed on the light receiving surface of each light receiving element is converted into a signal voltage (or electric charge) corresponding to its incident light.

The signal charge accumulated in the image pickup device 222 is read out as a voltage signal depending on the signal charge on the basis of a readout signal added from the device control unit 216. The voltage signal read out from the image pickup device 222 is added to an A/D converter 224, sequentially converted in the A/D converter 224 into a digital R, G, or B signal corresponding to a color filter array, and temporarily stored in the memory unit 226.

The memory unit 226 includes a SDRAM that is a volatile memory, an EEPROM that is a rewritable and non-volatile memory, and the like, and the SDRAM is used as a work area for executing a program by the CPU 212, or as a storage area for transitorily holding a digital image signal which is captured and acquired. On the other hand, the EEPROM has stored therein a camera control program including an image processing program, defect information concerning the pixel in the image pickup device 222, and, various parameters, tables and the like used for the image processing or the like.

The image processing unit 228 performs a predetermined signal process such as a flaw correction process, white balance correction, gamma correction process, demosaicing process, YC process and the like according to the invention on the digital image signal temporarily stored in memory unit 226. The flaw correction process on a defective pixel (flawed pixel) of the image pickup device 222 is described later in detail.

The image data processed by the image processing unit 228 is encoded in an encoder 230 into data for image displaying, and output via a driver 232 to the display unit 225 which is provided on the back side of the camera. This allows the subject image to be continuously displayed on a display screen of the display unit 225.

When the shutter button of operation unit 214 is pressed down at the first stage (halfway press), the CPU 212 starts the AF operation and the AE operation, and moves the focus lens of the lens unit 218 in an optical axis direction via the device control unit 216 to control the focus lens to be positioned at a focusing position.

In the halfway pressing of the shutter button, the CPU 212 calculates a brightness of the subject (imaging Ev value) on the basis of the image data output from the A/D converter 224 to determine exposure conditions (F-number, shutter speed) from the imaging Ev value.

After the AE operation and the AF operation end, when the shutter button is pressed down at the second stage (full press), the diaphragm, the shutter 220, and an electrical charge accumulation period for the image pickup device 222 are controlled based on the determined exposure conditions to carry out actual capturing of image. An RGB mosaic image obtained in the actual capturing of image by being read out from the image pickup device 222 and subjected to A/D conversion by the A/D converter 224 is transitorily stored in the memory unit 226.

The image data transitorily stored in the memory unit 226 is properly read out by the image processing unit 228 and subjected in the image processing unit 228 to a predetermined signal process including the flaw correction process, white balance correction, gamma correction process, demosaicing process, YC process, and the like. The image data having been subjected to the YC process (YC data) is compressed according to a predetermined compression format (e.g., JPEG method), and the compressed image data is recorded in the internal memory or the external memory in a predetermined image file (e.g., Exif file) format.

The capturing device 210 has a GPS 242. The GPS 242 is controlled by the CPU 212 and can get a position of the capturing device 210 (imaging position). Specifically, the capturing device 210 can get, by way of the GPS 242, information on the imaging position in imaging the object 1 to be measured. The capturing device 210 may not necessarily have the GPS so long as the information on the imaging position can be obtained.

The capturing device 210 has a gyro sensor 244 (gyroscope). The gyro sensor 244 is controlled by the CPU 212 and identifies the imaging orientation of the capturing device 210 (tilt orientation). The capturing device 210 may not necessarily have the gyro sensor so long as information on the imaging orientation of the capturing device 210 (tilt orientation) can be obtained.

The capturing device 210 has an electronic compass 246. The electronic compass 246 is controlled by the CPU 212 and identifies a direction of the imaging orientation of the capturing device 210 (pan orientation). The capturing device 210 may not necessarily have the electronic compass 246 so long as the direction of the imaging orientation of the capturing device 210 (pan orientation) can be identified.

In FIG. 6, the description is given of the capturing device that acquires the captured image usable for the image assessment device 100 according to the invention, but the capturing device may have the image assessment device 100 according to the invention in another embodiment. Specifically, the capturing device having the image assessment device 100 may be employed as another embodiment. Moreover, it may be such that the image assessment device 100 is included in a computer, plural captured images imaged by the capturing device are brought into the computer, and the image assessment device 100 in the computer performs the image assessment process.

Modification Example 1 of Image Assessment Device

In the image assessment device 100, the assessment unit 135 may assess that the first captured image and the second captured image are of the image pair, further in a case where a value of a resolving power $\Delta Z$ is equal to or less than a threshold, the resolving power $\Delta Z$ being expressed by [Formula 1] below including a base length L between the capturing device at the first imaging position and the capturing device at the second imaging position.

$$\Delta Z = \frac{Z^2}{(f/p) \times L} \qquad \text{[Formula 1]}$$

Where $\Delta Z$ represents a resolving power, Z represents a distance between the first imaging position and the object 1 to be measured which is acquired by the object distance to-be-measured acquisition unit 120. f represents a focal length. p represents a pixel pitch of the image pickup device in the capturing device which acquires the first captured image. L represents a base length between the capturing device at the first imaging position and the capturing device at the second imaging position. A method for acquiring the focal length for the pixel pitch p of the image pickup device is not specifically limited. In other words, the first captured image has information on the focal length f and pixel pitch p of the image pickup device added thereto, which information the assessment unit 135 may acquire, or a value of the focal length for pixel pitch p may be separately input to the image assessment device 100. In this description, the distance between the capturing device at the first imaging position and the capturing device at the second imaging position is set to the base length, but not limited thereto, various forms of information may be used so long as the information indicates the distance between the capturing device at the first imaging position and the capturing device at the second imaging position.

Figure 7:
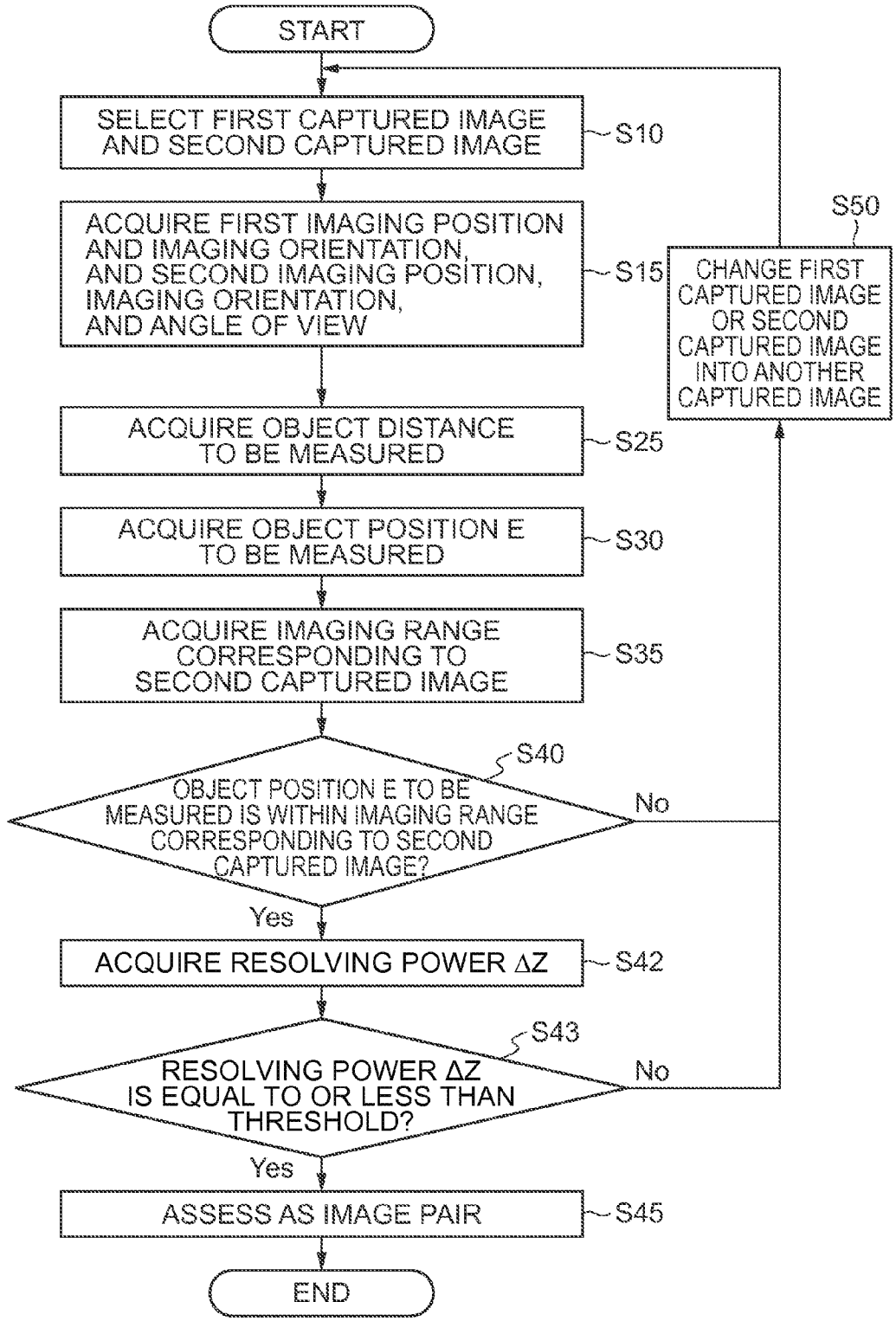
FIG. 7 is a chart illustrating an operation flow concerning a modification example 1 of the image assessment device.

FIG. 7 is an operation flow diagram concerning the modification example 1 of the image assessment device 100. The parts the same as those in the operation flow diagram in FIG. 5 are designated by the same reference signs and a description thereof is omitted. In comparing the operation flow diagram illustrated in FIG. 7 with the operation flow diagram illustrated in FIG. 5, the operation flow diagram illustrated in FIG. 7 is different in that after it is determined whether or not the object position E to be measured is within the imaging range corresponding to the second captured image (step S40), the resolving power ΔZ is acquired (step S42) and the resolving power ΔZ is determined to be equal to or less than the threshold (step S43).

In the flow diagram shown in FIG. 7, the assessment unit 135 determines whether or not the object position E to be measured is within the imaging range corresponding to the second captured image (step S40), and then, acquires the resolving power ΔZ owing to the first captured image and the second captured image if the object position E to be measured is determined to be within the imaging range corresponding to the second captured image (step S42). Next, the assessment unit 135 assesses whether or not the acquired resolving power ΔZ is equal to or less than the threshold (step S43). The threshold is not specifically limited so long as it is decided depending on an imaging environment or an effect regarding the 3D measurement. It has been confirmed that a 3D shape can be created at an almost non-problematic level with the resolving power ΔZ of about 1% with respect to the object distance to be measured. Therefore, in a case of an object at a distance of 10 m, the resolving power required is about 0.1 m.

When the assessment unit 135 determines that the resolving power owing to the first captured image and the second captured image is equal to or less than the threshold, the assessment unit 135 assesses that the first captured image and the second captured image are of the image pair.

By employing an aspect of the modification example 1 of the image assessment device 100, the resolving power is added to criteria for assessing the image pair, which allows selection of the image pair capable of more accurate 3D measurement.

The acquisition of the resolving power ΔZ (step S42) and the determination of whether or not the resolving power ΔZ is equal to or less than the threshold (step S43) may be performed before the determination of whether or not the object position E to be measured is within the imaging range corresponding to the second captured image (step S40).

Modification Example 2 of Image Assessment Device

In the image assessment device 100, the second captured image selection unit 110 may select a captured image having a value of a resolving power ΔZ equal to or less than the threshold as the second captured image, the resolving power ΔZ being expressed by [Formula 2] below including a base length Lx between the capturing device at the first imaging position and the capturing device at the imaging position for a single captured image of the plural captured images.

$$\Delta Z = \frac{Z^2}{(f/p) \times Lx}$$ [Formula 2]

Where ΔZ represents a resolving power, Z represents a distance between the first imaging position and the object 1 to be measured which is acquired by the object distance to-be-measured acquisition unit 120. f represents a focal length. p represents a pixel pitch of the image pickup device in the capturing device which acquires the first captured image. Lx represents a base length between the capturing device at the first imaging position and the capturing device at the imaging position for a single captured image of the plural captured images. A method for acquiring the focal length for the pixel pitch p of the image pickup device is not specifically limited. In other words, the first captured image has information on the focal length f and pixel pitch p of the image pickup device added thereto, which information the assessment unit 135 may acquire, or a value of the focal length for pixel pitch p may be separately input to the image assessment device 100. In this description, the distance between the capturing device at the first imaging position and the capturing device at the imaging position for the single captured image of the plural captured images is set to the base length, but not limited thereto, various forms of information may be used so long as the information indicates the distance between the capturing device at the first imaging position and the capturing device at the imaging position for a single captured image of the plural captured images.

Figure 8:
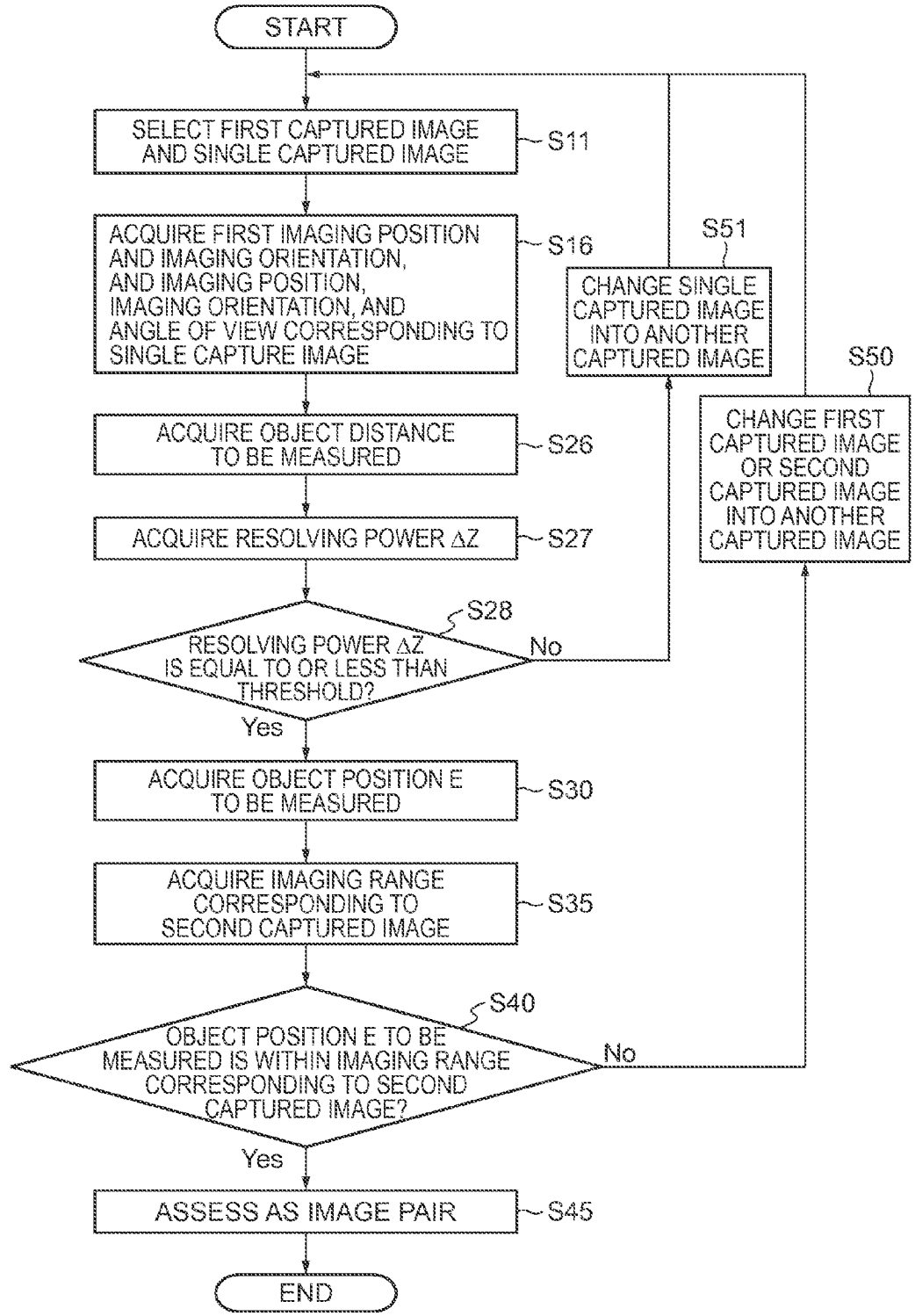
FIG. 8 is a chart illustrating an operation flow concerning a modification example 2 of the image assessment device.

FIG. 8 is an operation flow diagram concerning the modification example 2 of the image assessment device 100. The parts the same as those in the operation flow diagram in FIG. 5 are designated by the same reference signs and a description thereof is omitted. In comparing the operation flow diagram illustrated in FIG. 8 with the operation flow diagram illustrated in FIG. 5, the operation flow diagram illustrated in FIG. 5 is different in that the resolving power ΔZ is acquired (step S42), the resolving power ΔZ is determined to be equal to or less than the threshold (step S43), and a single imaging is changed into another captured image if the resolving power ΔZ is determined not to be equal to or less than the threshold (step S51). Moreover, in the modification example 2 of the image assessment device 100, the second captured image selection unit 110 decides the second captured image after determining that the resolving power ΔZ is equal to or less than the threshold (step S28), which is different from the image assessment device 100 shown in FIG. 2. Specifically, in the modification example 2 of the image assessment device 100, the second captured image selection unit 110 acquires the information on the object distance to be measured from an object distance to be measured unit, calculates the resolving power ΔZ, determines that the resolving power ΔZ is equal to or less than the threshold, and decides that the selected single captured image is the second captured image.

In the flow diagram shown in FIG. 8, after the object distance to be measured is acquired (step S26), the second captured image selection unit 110 acquires the resolving power ΔZ (step S27). Then, the second captured image selection unit 110 assesses whether or not the resolving power ΔZ is equal to or less than the threshold (step S28). If the resolving power ΔZ is determined to be equal to or less than the threshold, a second image selection unit determines that the selected single captured image is the second captured image. Then, an object position to-be-measured acquisition unit acquires the object position E to be measured (step S30). On the other hand, if a second captured image unit does not determine that the resolving power ΔZ is equal to or less than the threshold, the single captured image is changed into another captured image (step S51). The threshold is not specifically limited so long as it is decided depending on an imaging environment or an effect regarding the 3D measurement. It has been confirmed that a 3D shape can be created at an almost non-problematic level with the resolving power of about 1% with respect to the object distance to be measured. Therefore, in a case of an object at a distance of 10 m, the resolving power required is about 0.1 m.

By employing an aspect of the modification example 2 of the image assessment device 100, the resolving power is added to the criteria for assessing the image pair, which allows selection of the image pair capable of more accurate 3D measurement. Additionally, the second captured image selection unit 110 selects the captured image having the value of the resolving power ΔZ equal to or less than the threshold, reducing extra calculation after the second captured image is selected.

Modification Example 3 of Image Assessment Device

In the image assessment device 100, the assessment unit 135 may assess that the first captured image and the second captured image are of the image pair, further in a case where an angle α formed by the meeting of the optical axis of the capturing device at the first imaging position with the straight line C which connects the capturing device at the first imaging position to the capturing device at the second imaging position, and an angle β formed by the meeting of the optical axis of the capturing device at the second imaging position with the straight line C are both 45° or more and 135° or less.

Figure 9:
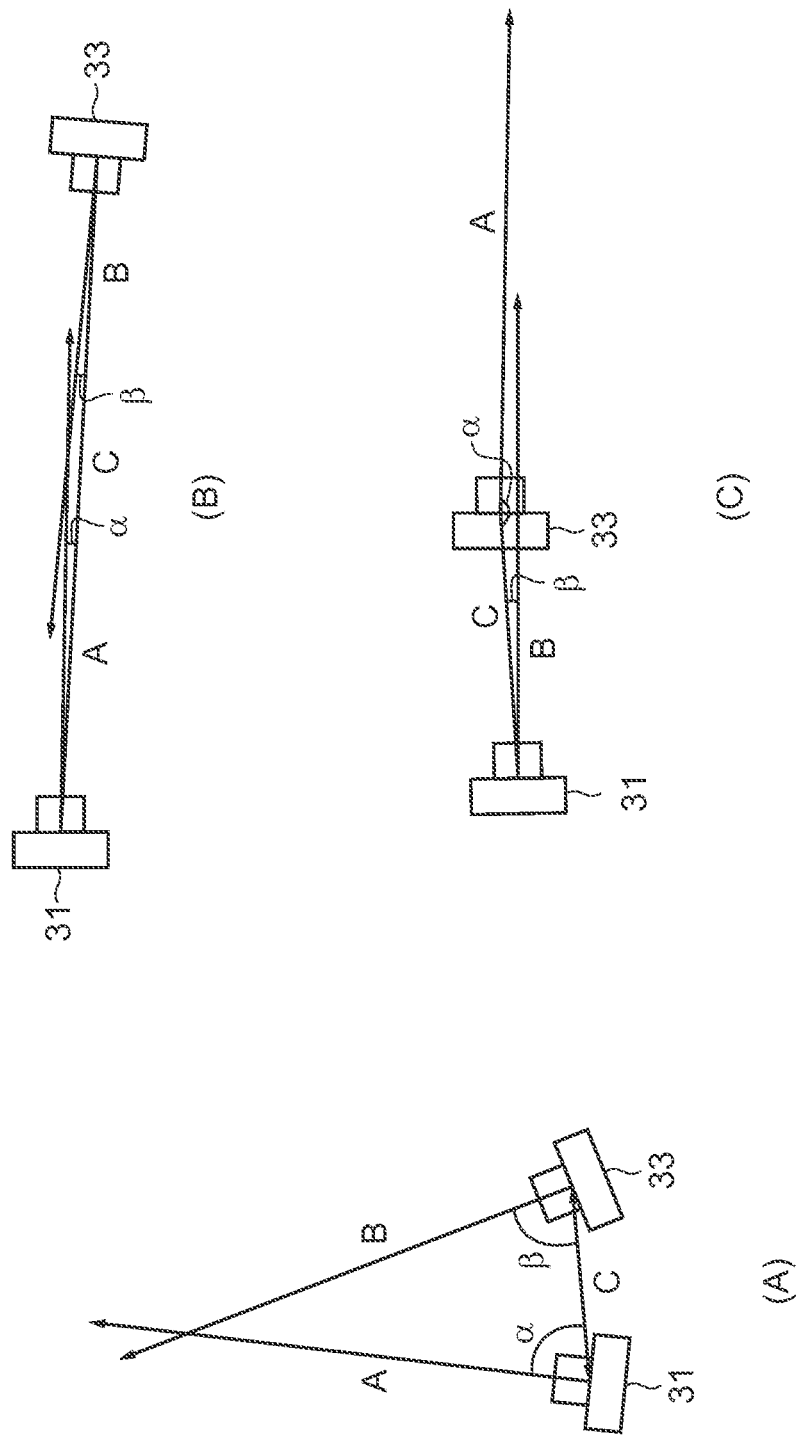
FIG. 9 is an illustration explaining an angle α and an angle β.

With reference to FIG. 9, the angle α and the angle β are described. FIG. 9 shows the capturing device 31 for capturing the first captured image at the first imaging position, and the capturing device 33 for capturing the second captured image at the second imaging position. The optical axis in capturing by the capturing device 31 is shown by the straight line A, and the optical axis in capturing by the capturing device 33 is shown by the straight line B. The straight line connecting the capturing device 31 to the capturing device 33 is shown by the straight line C. An angle formed by meeting of the straight line A with the straight line C is designated by a reference character α, and an angle formed by meeting of the straight line B with the straight line C is designated by a reference character β.

(A) portion of FIG. 9 shows a proper positional relationship between the capturing device 31 and the capturing device 33. That is, the angle α and the angle β are 45° or more and 135° or less, and the captured image captured by the capturing device 31 and the captured image captured by the capturing device 33 are of the image pair which is suitable in terms of the 3D measurement. The range of the angle α and angle β is not specifically limited so long as the image pair suitable in terms of the 3D measurement can be acquired. For example, the angle α and the angle β may be in a range of 60° or more and 120° or less.

(B) portion and (C) portion of FIG. 9 show an improper positional relationship between the capturing device 31 and the capturing device 33. In (B) portion of FIG. 9, the angle α and the angle β are 45° or less, where the capturing device 31 and the capturing device 33 are in an improper positional relationship. In (C) portion of FIG. 9, the angle α is more than 135° and the angle β is less than 45°, where the capturing device 31 and the capturing device 33 are in an improper positional relationship. In a case where the capturing device 31 and the capturing device 33 are at improper positions, if the captured images acquired by the capturing device 31 and the capturing device 33 are used to create an image pair and the 3D measurement is performed, the accurate 3D measurement cannot be performed in some cases.

Figure 10:
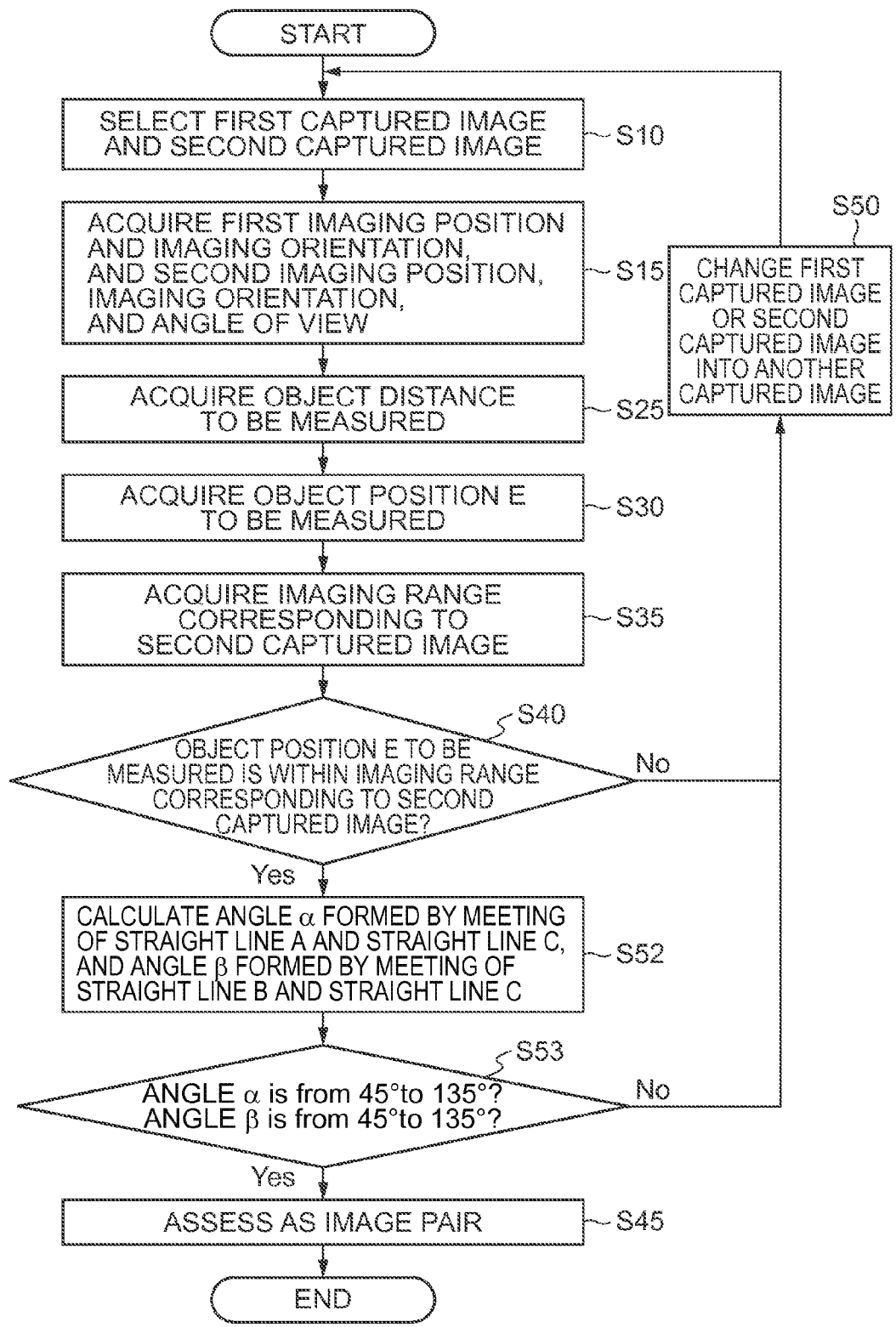
FIG. 10 is a chart illustrating an operation flow concerning a modification example 3 of the image assessment device.

FIG. 10 is an operation flow diagram concerning the modification example 3 of the image assessment device 100. The parts the same as those in the operation flow diagram in FIG. 5 are designated by the same reference signs and a description thereof is omitted. In comparing the operation flow diagram illustrated in FIG. 10 with the operation flow diagram illustrated in FIG. 5, the operation flow diagram illustrated in FIG. 10 is different in that after it is determined whether or not the object position E to be measured is within the imaging range corresponding to the second captured image (step S40), the angle α formed by the meeting of the straight line A with the straight line C, and the angle β formed by meeting of the straight line B with straight line C are calculated (step S52), and it is determined whether or not the angle α and the angle β are 45° or more and 135° or less (step S53).

In the flow diagram shown in FIG. 10, the assessment unit 135 determines whether or not the object position E to be measured is within the imaging range corresponding to the second captured image (step S40), and calculates the angle α formed by meeting of the straight line A with the straight line C and the angle β formed by meeting of the straight line B with the straight line C if the object position E to be measured is determined to be within the imaging range corresponding to the second captured image (step S52). Then, the assessment unit 135 determines whether or not the angle α and the angle β are 45° or more and 135° or less (step S53). If the angle α and the angle β are 45° or more and 135° or less, the assessment unit 135 assesses that the first captured image and the second captured image are of the image pair (step S45). On the other hand, if the angle α and the angle β are not 45° or more nor 135° or less, the first or second captured image is changed into another captured image (step S50). The calculation of the angle α formed by meeting of the straight line A with the straight line C and the angle β formed by meeting of the straight line B with the straight line C (step S52), and the determination of whether or not the angle α and the angle β are 45° or more and 135° or less (step S53) may be performed before the determination of whether or not the object position E to be measured is within the imaging range corresponding to the second captured image (step S40).

By employing an aspect of the modification example 3 of the image assessment device 100, the angle α and the angle β are added to the criteria for assessing the image pair, which allows selection of the image pair capable of more accurate 3D measurement.

Modification Example 4 of Image Assessment Device

In the image assessment device 100, further in a case where the angle α formed by meeting of the optical axis of the capturing device at the first imaging position with a straight line which connects the capturing device at the first imaging position to the capturing device at the imaging position for a single captured image of the plural captured images, and the angle β formed by meeting of the optical axis of the capturing device at the imaging position for the single captured image of the plural captured images with the straight line are both 45° or more and 135° or less, the second captured image selection unit 110 may select the single captured image as the second captured image.

In other words, in the modification example 4 of the image assessment device 100, the second captured image selection unit 110 selects a single captured image, acquires the angle α and the angle β regarding the first captured image and the single captured image, and decides that the single captured image is the second captured image if the angle α and the angle β are 45° or more and 135° or less. In the case of the modification example 4 of the image assessment device 100, assume that the capturing device 33 described in FIG. 9 is the capturing device for capturing the single captured image.

Figure 11:
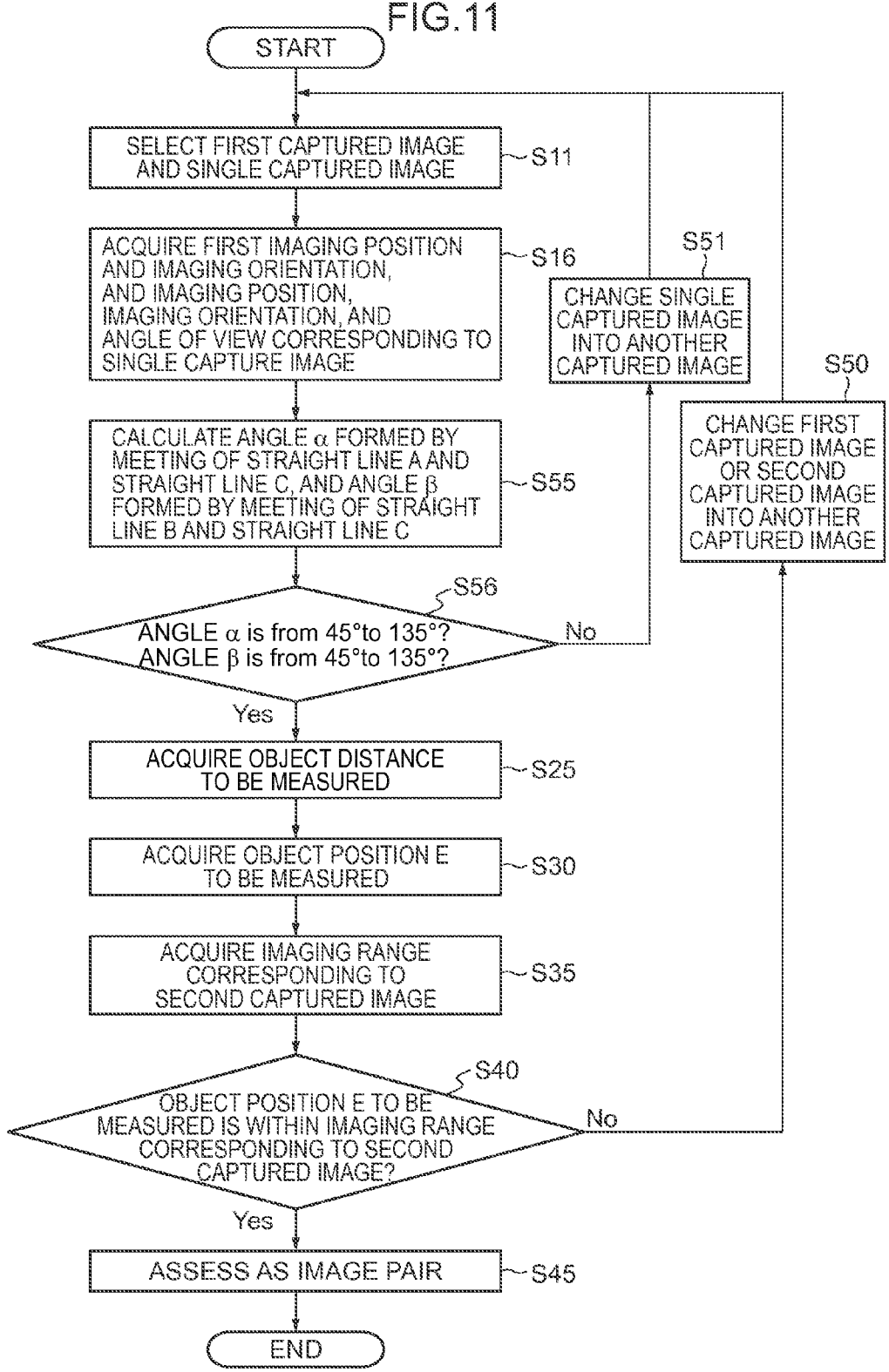
FIG. 11 is a chart illustrating an operation flow concerning a modification example 4 of the image assessment device.

FIG. 11 is an operation flow diagram concerning the modification example 4 of the image assessment device 100. The parts the same as those in the operation flow diagram in FIG. 5 are designated by the same reference signs and a description thereof is omitted. In comparing the operation flow diagram illustrated in FIG. 11 with the operation flow diagram illustrated in FIG. 5, the operation flow diagram illustrated in FIG. 11 is different in that the angle α formed by meeting of the straight line A with the straight line C and the angle β formed by meeting of the straight line B with the straight line C are calculated (step S52), it is determined whether or not the angle α and the angle β are 45° or more and 135° or less (step S53), and the single imaging is changed into another captured image if the angle α and the angle β are not 45° or more nor 135° or less (step S51). Moreover, in the modification example 4 of the image assessment device 100, the second captured image selection unit 110 decides the second captured image after determining whether or not the angle α and the angle β are 45° or more and 135° or less (step S53), which is different from the image assessment device 100 shown in FIG. 2.

FIG. 11 is an operation flow diagram of the modification example 4 of the image assessment device 100. The parts the same as those in the operation flow diagram in FIG. 5 are designated by the same reference signs and a description thereof is omitted. In comparing the operation flow diagram illustrated in FIG. 11 with the operation flow diagram illustrated in FIG. 5, the operation flow diagram illustrated in FIG. 11 is different in that the angle α formed by meeting of the straight line A with the straight line C and the angle β formed by meeting of the straight line B with the straight line C are calculated (step S55), and it is determined whether or not the angle α and the angle β are 45° or more and 135° or less (step S56). Moreover, the single captured image is changed into another captured image if the angle α and the angle β are not 45° or more nor 135° or less (step S51), which is also different from the operation flow diagram illustrated in FIG. 5.

In the modification example 4 of the image assessment device 100, the second captured image selection unit 110 decides the second captured image after determining that the angle α and the angle β are 45° or more and 135° or less (step S56), which is different from the image assessment device 100 shown in FIG. 2. In other words, in the modification example 4 of the image assessment device 100, the second captured image selection unit 110 acquires the information on the first captured image from the object distance to-be-measured acquisition unit 120, calculates the angle α and the angle β, determines that the angle α and the angle β are 45° or more and 135° or less, and decides that the selected single captured image is the second captured image.

In the flow diagram shown in FIG. 11, the second captured image selection unit 110 calculates the angle α formed by meeting of the straight line A with the straight line B and the angle β formed by meeting of the straight line B with the straight line C (step S55). Then, the second captured image selection unit 110 determines whether or not the angle α and the angle β are 45° or more and 135° or less. If the angle α and the angle β are determined to be 45° or more and 135° or less, the second image selection unit determines that the selected single captured image is the second captured image. Then, the object position to-be-measured calculation unit 125 acquires the object position E to be measured (step S30). On the other hand, if the second captured image selection unit 110 determines that the angle α and the angle β are not 45° or more nor 135° or less, the single captured image is changed into another captured image (step S51).

By employing an aspect of the modification example 4 of the image assessment device 100, the angle α and the angle β are added to the criteria for assessing the image pair, which allows selection of the image pair capable of more accurate 3D measurement. Additionally, the second captured image selection unit 110 selects the second captured image with taking into account the angle α and the angle β, reducing extra calculation after the second captured image is selected.

Modification Example 5 of Image Assessment Device

Figure 12:
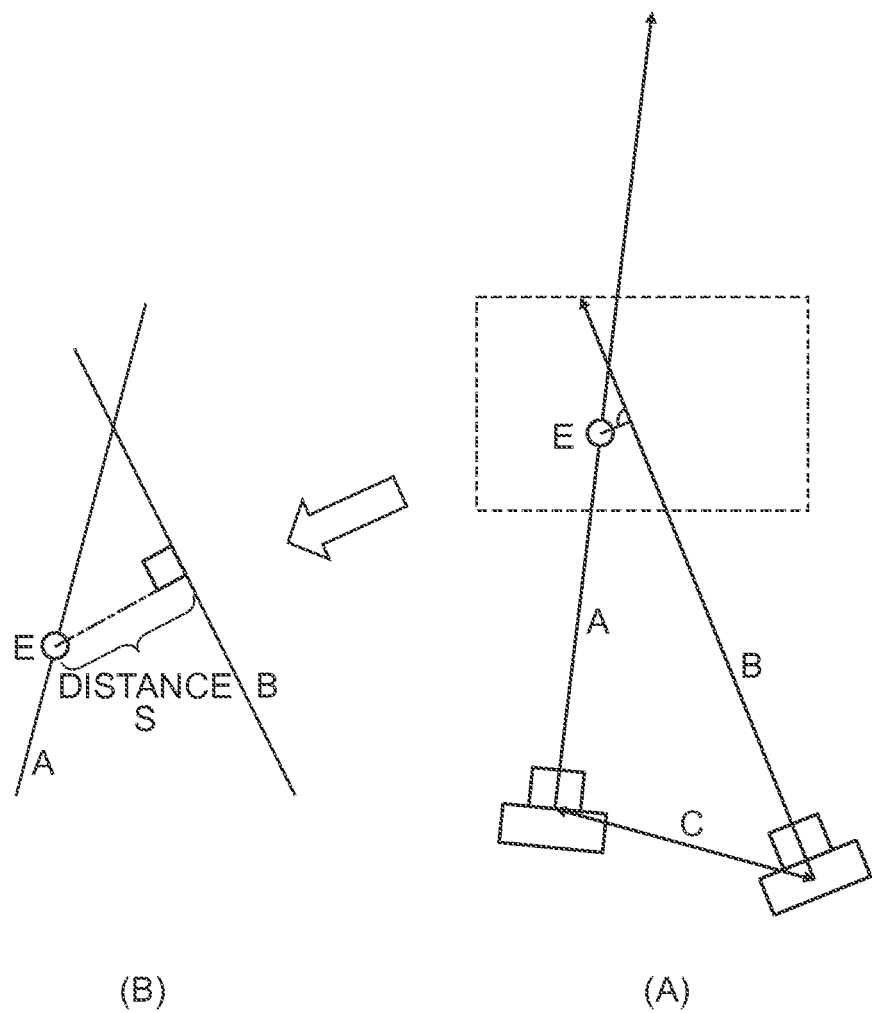
FIG. 12 is an illustration explaining a distance S.

In the image assessment device 100, the assessment unit 135 may assess that the first captured image and the second captured image are of the image pair, further in a case a distance S between the object position E to be measured and the optical axis of the capturing device at the imaging position for the second captured image is equal to or less than the threshold. With reference to FIG. 12, the distance S is described.

(A) portion of FIG. 12 shows the capturing device 31 for capturing the first captured image at the first imaging position. The capturing device 33 for capturing the second captured image at the second imaging position is also shown. The optical axis in capturing by the capturing device 31 is shown by the straight line A, and the optical axis in capturing by the capturing device 33 is shown by the straight line B. The straight line connecting the capturing device 31 to the capturing device 33 is shown by the straight line C. The object position to be measured is designated by a reference character E.

(B) portion of FIG. 12 shows an enlarged view of a dotted-lined rectangular in (A) portion of FIG. 12. In addition, the distance S between the straight line B and the object position E to be measured is shown. The shorter the distance S, the larger an overlapped area of the first captured image and the second captured image, which is more suitable as the image pair in terms of the 3D measurement. A threshold of the distance S is not specifically limited, and may have various values depending on a size of the object to be measured, performance of the capturing device for acquiring the captured image, accuracy of the 3D measurement and the like. For example, if the distance S is 5 m or less, preferably 3 m or less, and more preferably 1 m or less, the image pair capable of the 3D measurement with good accuracy can be selected even if the object to be measured is a large object such as a building. Further, if the distance S is 100 cm or less, preferably 80 cm or less, and more preferably 50 cm or less, the image pair capable of the 3D measurement requiring for high accuracy can be selected.

Figure 13:
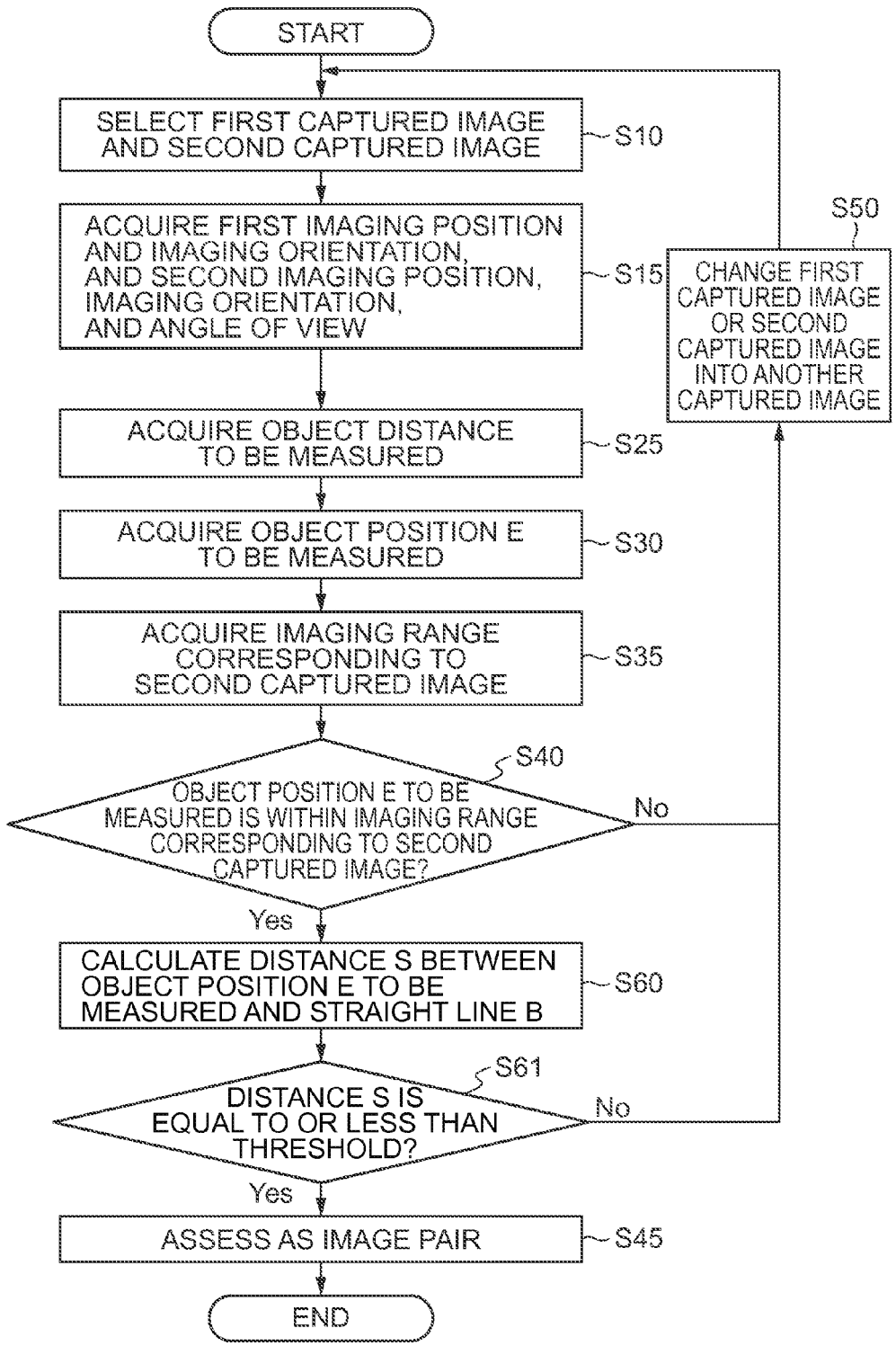
FIG. 13 is a chart illustrating an operation flow concerning a modification example 5 of the image assessment device.

FIG. 13 is an operation flow diagram concerning the modification example 5 of the image assessment device 100. The parts the same as those in the operation flow diagram in FIG. 5 are designated by the same reference signs and a description thereof is omitted. In comparing the operation flow diagram illustrated in FIG. 13 with the operation flow diagram illustrated in FIG. 5, the operation flow diagram illustrated in FIG. 13 is different in that after it is determined whether or not the object position E to be measured is within the imaging range corresponding to the second captured image (step S40), the distance S between the object position E to be measured and the straight line B is calculated (step S60), and it is determined whether or not the distance S is equal to or less than the threshold (step S61).

In the flow diagram shown in FIG. 13, the assessment unit 135 determines whether or not the object position E to be measured is within the imaging range corresponding to the second captured image (step S40), and calculates the distance S between the object position E to be measured and the straight line B if the object position E to be measured is determined to be within the imaging range corresponding to the second captured image (step S60). Then, the assessment unit 135 determines whether or not the distance S is equal to or less than the threshold (step S61). If the distance S is equal to or less than the threshold, the assessment unit 135 assesses that the first captured image and the second captured image are of the image pair (step S45). On the other hand, if the distance S is not equal to nor less than the threshold, the first or second captured image is changed into another captured image (step S50). The calculation of the distance S between the object position E to be measured and the straight line B (step S60) and the determination of whether or not the distance S is equal to or less than the threshold (step S61) may be performed before the determination of whether or not the object position E to be measured is within the imaging range corresponding to the second captured image (step S40).

By employing an aspect of the modification example 5 of the image assessment device 100, the distance S is added to the criteria for assessing the image pair, which allows selection of the image pair capable of more accurate 3D measurement.

Modification Example 6 of Image Assessment Device

In the image assessment device 100, further in a case where the distance S between the object position E to be measured and the optical axis of the capturing device at the imaging position for a single captured image of the plural captured images is equal to or less than the threshold, the second captured image selection unit 110 may select the single captured image as the second captured image.

In other words, in the modification example 6 of the image assessment device 100, the second captured image selection unit 110 calculates the distance S between the object position E to be measured and the straight line B, and decides the single captured image as the second captured image if the distance S is equal to or less than the threshold. In the case of the modification example 6 of the image assessment device 100, assume that the capturing device 33 described in FIG. 12 is the capturing device for capturing the single captured image.

Figure 14:
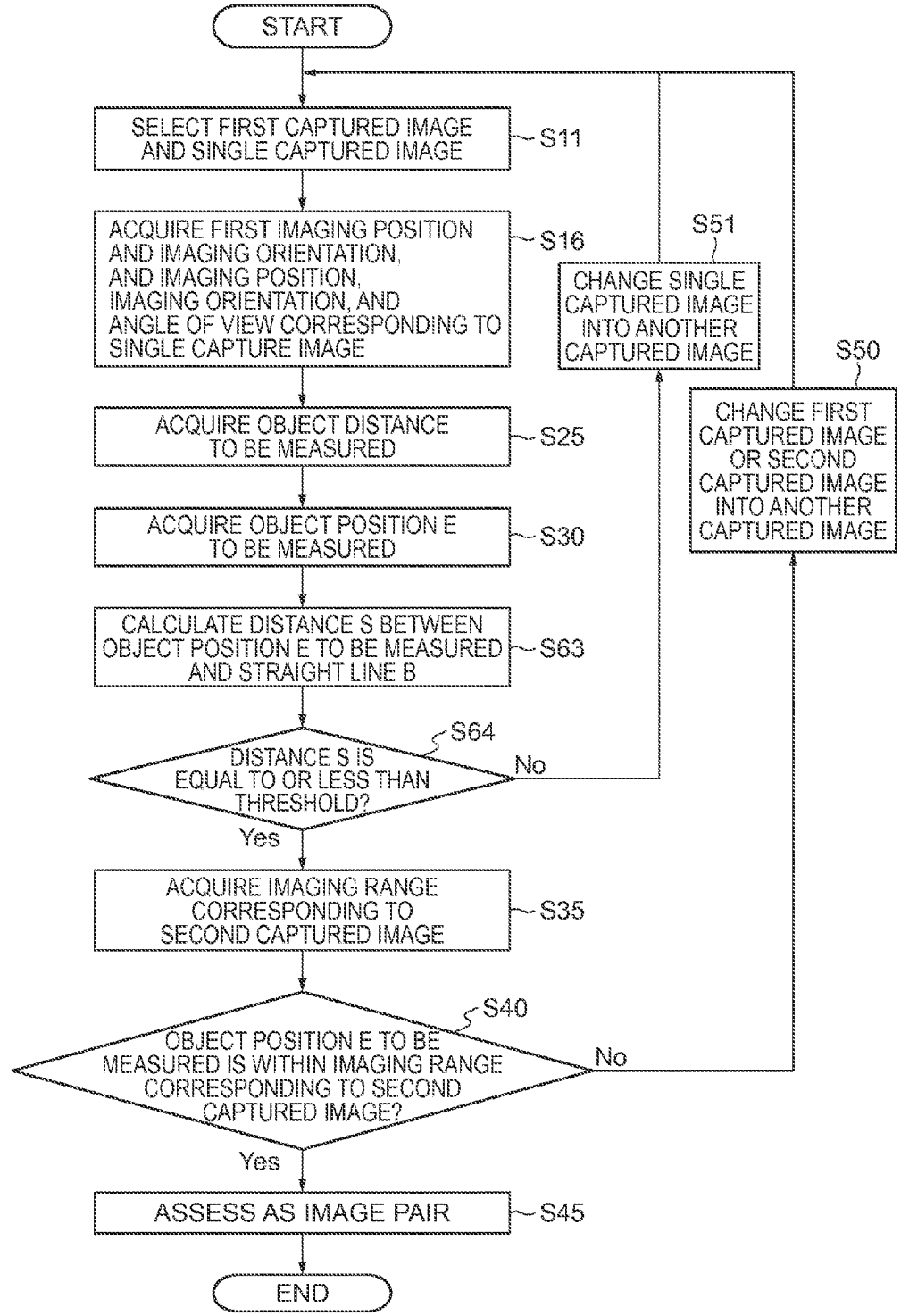
FIG. 14 a chart illustrating an operation flow concerning a modification example 6 of the image assessment device.

FIG. 14 is an operation flow diagram concerning the modification example 6 of the image assessment device 100. The parts the same as those in the operation flow diagram in FIG. 5 are designated by the same reference signs and a description thereof is omitted. In comparing the operation flow diagram illustrated in FIG. 14 with the operation flow diagram illustrated in FIG. 5, the operation flow diagram illustrated in FIG. 14 is different in that the distance S between the object position E to be measured and the straight line B is calculated (step S63), it is determined whether or not the distance S is equal to or less than the threshold (step S64), and the single imaging is changed into another captured image if the distance S is more than the threshold (step S51). Moreover, the second captured image is decided after determining whether or not the distance S is equal to or less than the threshold (step S64), which is different from the image assessment device 100 shown in FIG. 2.

In the modification example 6 of the image assessment device 100, the second captured image selection unit 110 decides the second captured image after determining whether or not the distance S is equal to or less than the threshold (step S64), which is different from the image assessment device 100 shown in FIG. 2. Specifically, in the modification example 6 of the image assessment device 100, the second captured image selection unit 110 acquires the information on the object position E to be measured from the object position to-be-measured calculation unit 125, determines that the distance S is equal to or less than the threshold, and decides the selected single captured image is the second captured image.

In the flow diagram shown in FIG. 14, after the object position E to be measured is acquired (step S30), the second captured image selection unit 110 calculates the distance S between the object position E to be measured and the straight line B (step S63). Then, the second captured image selection unit 110 determines whether or not the distance S is equal to or less than the threshold (step S64). If the distance S is determined to be equal to or less than the threshold, the second image selection unit determines that the selected single captured image is the second captured image. Next, the imaging range calculation unit 130 acquires the imaging range corresponding to the second captured image. On the other hand, if the second captured image unit determines that the distance S is equal to or less than the threshold, the single captured image is changed into another captured image (step S51).

By employing an aspect of the modification example 6 of the image assessment device 100, the distance S is added to the criteria for assessing the image pair, which allows selection of the image pair capable of more accurate 3D measurement. Additionally, the second captured image selection unit 110 selects the second captured image with taking into account the distance S, reducing extra calculation after the second captured image is selected.

Modification Example 7 of Image Assessment Device

The image assessment device 100 may include a storage unit for storing the plural image pairs assessed by the assessment unit 135. Further, the device 100 may include a resolving power optimal pair assessment unit that assesses that a pair having the highest resolving power $\Delta Z$ is a resolving power optimal pair from a pair group, the pair being included in the pair group in which the first captured image or the second captured image of the image pair is identical in the plural image pairs stored in the storage unit.

Figure 15:
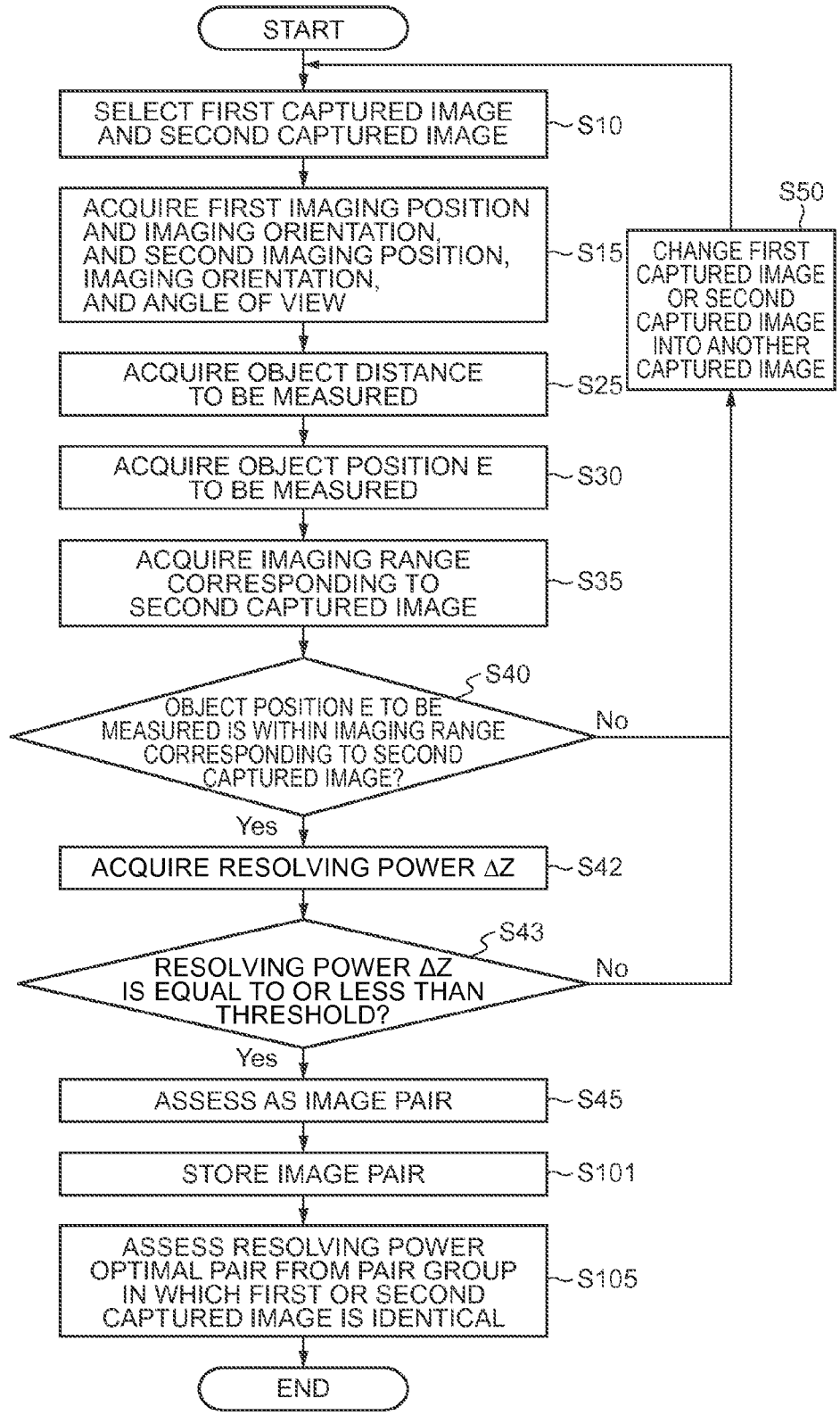
FIG. 15 is a chart illustrating an operation flow concerning a modification example 7 of the image assessment device.

In FIG. 15, the image pair is selected similarly to the operation flow of the image assessment device 100 illustrated in FIG. 7, and thereafter, the image pair is stored in the storage unit (image pair storage unit) (step S101), and the image pair having the highest resolving power $\Delta Z$ is selected from the pair group in which the first captured image is identical (step S105).

The storage unit in which the image pair is stored is equipped inside the image assessment device 100, but not limited thereto. The storage unit may be equipped outside the image assessment device 100. Moreover, it is preferable that the storage unit stores as one file the image pair assessed by the assessment unit 135. For example, it is preferable to record the image pair in a multi-picture format, but not limited thereto. Further, it is preferable to record, together with the image pair, information on the image pair such as the object distance to be measured, direction of the capturing device capturing the first captured image and the second captured image, base length and the like. The storage unit for the image pair and the storage method of the image pair are not limited to an aspect of the modification example 7 of the image assessment device 100, but the same goes for other aspects of the image assessment device 100.

The resolving power optimal pair assessment unit selects the image pair having the highest resolving power ΔZ from the image pair group in which the first captured image or the second captured image of the image pair stored in the storage unit is identical.

By employing an aspect of the modification example 7 of the image assessment device, the image pair having the highest resolving power ΔZ can be selected, leading to more accurate 3D measurement.

Modification Example 8 of Image Assessment Device

The image assessment device 100 may include a storage unit for storing the plural image pairs assessed by the assessment unit 135, and a distance S optimal pair assessment unit that assesses that a pair having the shortest distance S is a distance S optimal pair from a pair group, the pair being included in the pair group in which the first captured image or the second captured image of the image pair is identical in the plural image pairs stored in the storage unit.

Figure 16:
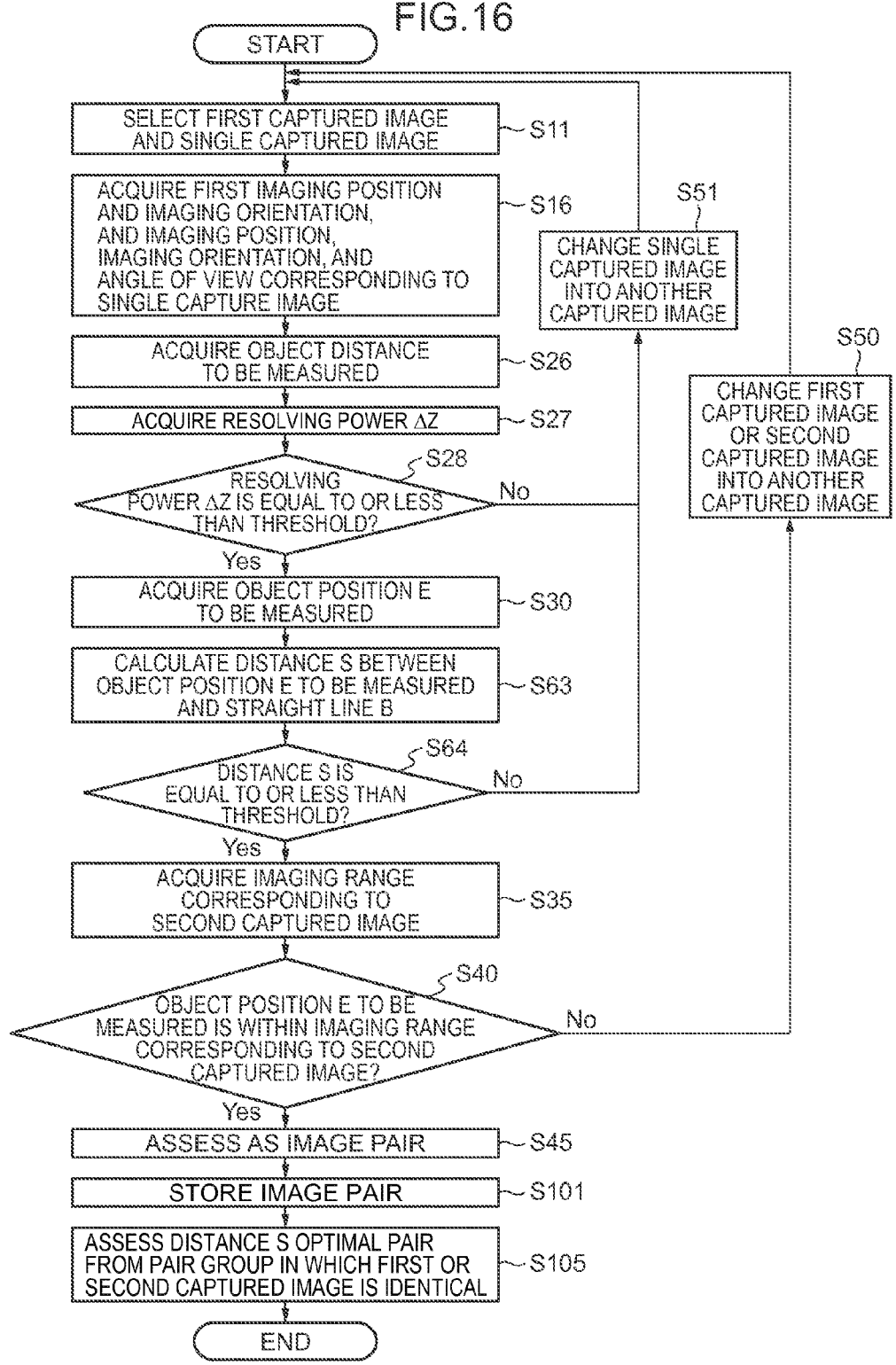
FIG. 16 is a chart illustrating an operation flow concerning a modification example 8 of the image assessment device.

In FIG. 16, the image pair is selected according to the operation flows of the image assessment device 100 illustrated in FIG. 8 and FIG. 14. In other words, the operation flow until the object position E to be measured is acquired (step S30) is similar to that illustrated in FIG. 8. A subsequent flow until the image pair is assessed (step S45) is similar to the operation flow of the image assessment device 100 illustrated in FIG. 14.

After that, the image pair is stored in the storage unit (image pair storage unit) (step S101), and the distance S optimal pair assessment unit selects the image pair having the shortest distance S from the pair group in which the first captured image or the second captured image is identical (step S105).

By employing an aspect of the modification example 8 of the image assessment device, the image pair having the shortest distance S can be selected, leading to more accurate 3D measurement.

The object of the invention can be achieved by also the 3D measuring device including the image assessment device described above. Using the 3D measuring device for the image pair assessed by the image assessment device enables the 3D measurement to be performed more accurately and more promptly.

The object of the invention can be achieved through reading out from a program code (program) and executing the program code by a computer (or CPU or MPU) in a system or device, the program code being stored in a storage medium and attaining procedures of the flows shown in the embodiments described above.

In this case, the program code per se read out from the storage medium achieves the functions of the embodiments described above. Therefore, this program code and a computer-readable storage medium storing/recording the program code also constitute one of the invention.

Examples of the storage medium for supplying the program code include, for example, a floppy (registered trademark) disk, hard disk, optical disk, magnetic optical disk, CD-ROM, CD-R, magnetic tape, non-volatile memory card, ROM and the like.

Moreover, the functions of the embodiments described above are achieved through executing the read out program by the computer. The execution of the program includes a case where an OS or the like running on the computer performs all or a part of actual processes on the basis of an instruction of the program.

Further, the functions of the embodiments described above may be achieved by also a function extension board inserted into a computer or a function extension unit connected with a computer. In this case, first, the program read out from the storage medium is written into a memory included in the function extension board inserted into the computer or function extension unit connected with the computer. After that, on the basis of an instruction of the program, the CPU or the like included in the function extension board or function extension unit performs all or a part of the actual processes. Processing by such a function extension board or function extension unit also achieves the functions of the embodiments described above.

Each step in the flows in the embodiments described above may not be necessarily attained by use of software (computer), but may be attained by use of hardware (electronic circuit).

Modification Example of Capturing Device

In FIG. 6, the description is given of the digital camera as an embodiment of the capturing device including the image assessment device 100 according to the invention or the capturing device for capturing plural captured images supplied to the image assessment device 100 according to the invention, but the configuration of an imaging device is not limited thereto. Examples of another imaging device according to the invention may include, for example, a built-in or external camera for PC, or a portable terminal device having the imaging function as described below.

Examples of the portable terminal device as an embodiment of the imaging device according to the invention include, for example, a mobile phone, smartphone, PDA (Personal Digital Assistants), portable game console. Hereinafter, a description is given in detail using the smartphone (multifunctional mobile phone) as an example with reference to the drawings.

Figure 17:
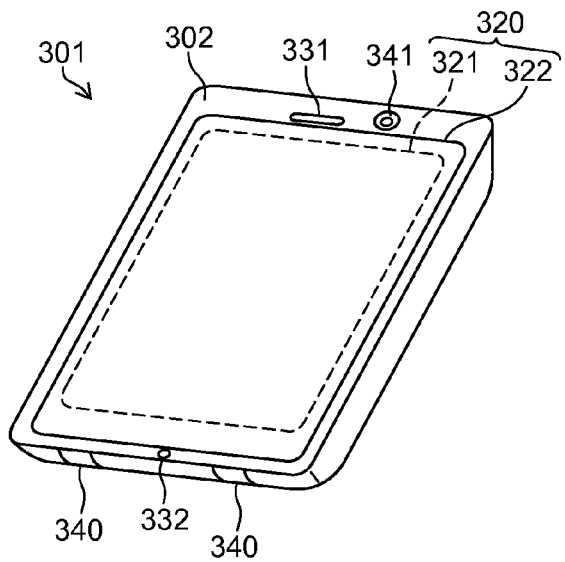
FIG. 17 is an illustration showing another aspect of the capturing device for capturing the plural captured images.

FIG. 17 shows an outer appearance of a smartphone 301 as an embodiment of the imaging device according to the invention. The smartphone 301 shown in FIG. 17 having a housing 302 shaped in a flat plate includes on one face of the housing 302 a display and input unit 320 in which a display panel 321 as a display unit and an operation panel 322 as an input unit are integrated. Such a housing 302 includes a speaker 331, microphone 332, operation unit 340, and camera unit 341. A configuration of the housing 302 is not limited thereto, and a configuration in which the display unit and the input unit are independent of each other, and a configuration having a clamshell structure or a slide mechanism may be used, for example.

Figure 18:
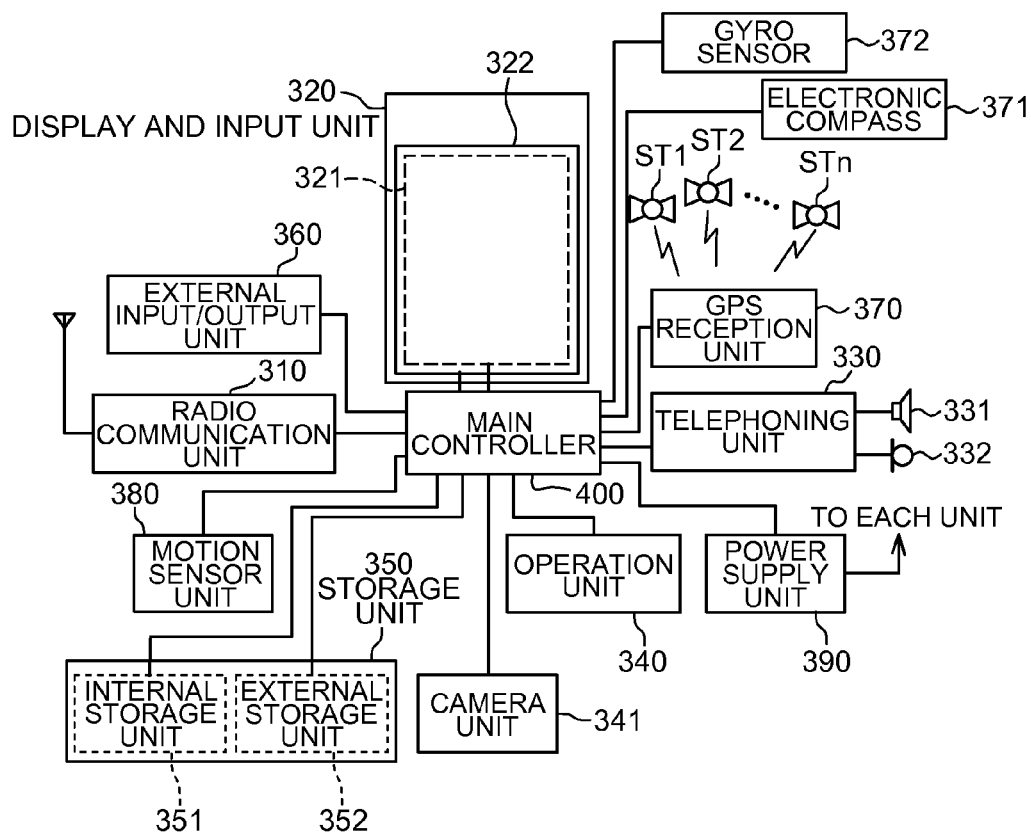
FIG. 18 is a block diagram showing a configuration of the capturing device shown in FIG. 17.

FIG. 18 is a block diagram showing the configuration of the smartphone 301 shown in FIG. 17. As shown in FIG. 18, included are as main components of the smartphone, a radio communication unit 310, display and input unit 320, telephoning unit 330, operation unit 340, camera unit 341, storage unit 350, external input/output unit 360, GPS (Global Positioning System) reception unit 370, electronic compass 371, gyro sensor 372, motion sensor unit 380, power supply unit 390, and main controller 400. The smartphone 301 has, as a main function, a radio communication function for carrying out mobile radio communication with a base station device BS via a mobile communication network NW.

The radio communication unit 310 carries out radio communication with the base station device BS included in the mobile communication network NW according to an instruction from the main controller 400. Such radio communication is used to transmit and receive various pieces of file data such as audio data, image data and the like, and e-mail data and the like and receive Web data, streaming data and the like.

The display and input unit 320 is a so-called touch panel which, by way of control by the main controller 400, displays and visually delivers to the user an image (still image and moving image) and text information, as well as detects a user's operation on the displayed information, and includes the display panel 321 and the operation panel 322.

The display panel 321 uses a LCD (Liquid Crystal Display), an OELD (Organic Electro-Luminescence Display) and the like as a display device. The operation panel 322, which is placed such that an image displayed on a display surface of the display panel 321 can be visually recognized, is a device for detecting one or more coordinates operated by a user's finger or a stylus. If the device like this is operated by a user's finger or a stylus, a detection signal generated due to the operation is output to the main controller 400. Subsequently, the main controller 400 detects an operated position (coordinates) on the display panel 321 on the basis of the received detection signal.

As shown in FIG. 17, the display panel 321 and operation panel 322 in the smartphone 301 which is illustrated as an embodiment of the imaging device according to the invention are integrated to constitute the display and input unit 320, and the operation panel 322 is arranged in a manner to fully cover the display panel 321. In a case of using such an arrangement, the operation panel 322 may have a function to detect the user's operation on also an area outside the display panel 321. In other words, the operation panel 322 may have a detection area for an overlapping portion overlapped with the display panel 321 (hereinafter, referred to as a displayed area) and a detection area for a peripheral portion not overlapped with the display panel 321 other than the overlapping portion (hereinafter, referred to as a non-displayed area).

Note that a size of the displayed area and a size of the display panel 321 may completely match each other, but both sizes may not necessarily match. The operation panel 322 may have two sensitive areas of the peripheral portion and an inside portion other than that. Further, a width of the peripheral portion is appropriately designed depending on a size of the housing 302 and the like. Examples of a position detection method used for the operation panel 322 include a matrix switch method, resistance film method, surface acoustic wave method, infrared ray method, electromagnetic induction method, electrostatic capacitance method and the like, any method of which may be used.

The telephoning unit 330 having the speaker 331 and the microphone 332 converts user voice input through the microphone 332 into the audio data processable by the main controller 400 to output to the main controller 400, and decodes the audio data received by the radio communication unit 310 or the external input/output unit 360 to output from the speaker 331. As shown in FIG. 17, for example, the speaker 331 may be mounted on the same face as the display and input unit 320 is provided, and the microphone 332 may be mounted on a lateral face of the housing 302.

The operation unit 340 which is a hardware key using a key switch and the like accepts an instruction from the user. For example, as shown in FIG. 17, the operation unit 340 is mounted on a lateral face of the housing 302 of the smartphone 301, and is a press-button type switch which is turned on when pressed down by a finger or the like and is brought into a turned-off state by a restoring force of a spring or the like when the finger is released.

The storage unit 350 stores a control program and control data for the main controller 400, application software, address data having a name, telephone number and the like of the communication other end associated with each other, data of transmitted and received e-mail, Web data downloaded by way of Web browsing, and downloaded content data, and transitorily stores streaming data or the like. The storage unit 350 includes an internal storage unit 351 built in the smartphone and an external storage unit 352 having a detachable external memory slot. Each of the internal storage unit 351 and the external storage unit 352 included in the storage unit 350 is attained by use of a storage medium such as a flash memory type, hard disk type, multimedia card micro type, card type memory (e.g., Micro SD (registered trademark) memory, etc.), RAM (Random Access Memory), and ROM (Read Only Memory).

The external input/output unit 360 serves as an interface with all external devices coupled to the smartphone 301 to allow other external devices to be directly or indirectly connected via a communication or the like (e.g., USB (Universal Serial Bus), IEEE1394, etc.) or network (e.g., Internet, wireless LAN, Bluetooth (registered trademark), RFID (Radio Frequency Identification), IrDA (Infrared Data Association) (registered trademark), UWB (Ultra Wideband) (registered trademark), ZigBee (registered trademark), etc.).

Examples of the external device coupled to the smartphone 301 include, for example, a wired/wireless head set, wired/wireless external charger, wired/wireless data port, memory card or SIM (Subscriber Identity Module Card)/UIM (User Identity Module Card) card connected via a card socket, external audio and video device connected via an audio and video I/O (Input/Output) terminal, external audio and video device via a wireless connection, smartphone via a wired/wireless connection, personal computer via a wired/wireless connection, PDA via a wired/wireless connection, personal computer via a wired/wireless connection, earphone, and the like. The external input/output unit 360 can deliver data received by way of transmission from such an external device above to the respective components in the smartphone 301 and transmit the data in the smartphone 301 to the external devices.

The GPS reception unit 370 receives GPS signals transmitted from GPS satellites ST1 to STn to perform positioning arithmetic processing on the basis of the received plural GPS signals according to an instruction from the main controller 400, and detects a position including latitude, longitude, and altitude of the smartphone 301. When positional information can be acquired from the radio communication unit 310 or the external input/output unit 360 (e.g., wireless LAN), the GPS reception unit 370 may use the positional information to detect the position.

The motion sensor unit 380 which includes, for example, a triaxial acceleration sensor or the like detects physical motion of the smartphone 301 according to an instruction from the main controller 400. Detection of the physical motion of the smartphone 301 allows a direction or acceleration of the motion of the smartphone 301 to be detected. Such a detection result is to be output to the main controller 400.

The power supply unit 390 supplies electrical power stored in a battery (not shown) to each unit of the smartphone 301 according to an instruction from the main controller 400.

The main controller 400 which includes a microprocessor operates according to the control program or control data stored in the storage unit 350 and collectively controls the respective units of the smartphone 301. The main controller 400 has a mobile communication controlling function to control each unit in a communication system and an application processing function in order to perform audio communication or data communication via the radio communication unit 310.

The application processing function is attained by the main controller 400 operating according to the application software stored in the storage unit 350. Examples of the application processing function include, for example, an infrared communication function to control the external input/output unit 360 to perform the data communication with an opposite device, e-mail function to transmit and receive an e-mail, Web browsing function to view a Web page, and the like.

The main controller 400 has an image processing function to display a video on the display and input unit 320 and so forth on the basis of the image data such as the received data or the downloaded streaming data (data of still image and moving image). The image processing function refers to a function that the main controller 400 decodes the above image data and subjects such a decoding result to the image processing to display the image on the display and input unit 320.

Further, the main controller 400 performs display control of the display panel 321 and operation detecting control to detect the user's operation via the operation unit 340 and the operation panel 322.

The main controller 400 performs the display control to display an icon for starting the application software or a software key such as a scroll bar, or display a window for creating an e-mail. Note the scroll bar refers to a software key for accepting an instruction to move a displayed portion of an image such as a large image not entirely accommodated within a displayed area of the display panel 321.

The main controller 400 performs the operation detecting control to detect the user's operation input via the operation unit 340, accepts via the operation panel 322 an operation on the above icon or input of a character string to an input field in the above window, or accepts a request input via the scroll bar for scrolling of the displayed image.

Further, the main controller 400 has a touch panel controlling function to, by performing the operation detecting control, to determine whether an operated position on the operation panel 322 is the overlapping portion (displayed area) overlapped with the display panel 321 or the peripheral portion (non-displayed area) not overlapped with the display panel 321 other than the overlapping portion to control the sensitive area of the operation panel 322 or a displayed position of the software key.

The main controller 400 can also detect a gesture operation on the operation panel 322 and perform a predetermined function depending on the detected gesture operation. The gesture operation means not a simple touch operation of related art, but an operation including tracking by a finger or the like, simultaneously specifying a plurality of positions, or combining these operations to track from at least one of a plurality of positions.

The camera unit 341 is a digital camera electronically imaging by use of the image pickup device such as a CMOS (Complementary Metal Oxide Semiconductor) or a CCD (Charge-Coupled Device). The camera unit 341 can under the control of the main controller 400 convert the image data obtained by capturing an image into a compressed image data such as JPEG (Joint Photographic coding Experts Group), for example, to store in the storage unit 350 and output via the external input/output unit 360 or the radio communication unit 310. In the smartphone 301 shown in FIG. 17, the camera unit 341 is mounted on the same face as the display and input unit 320, but, a mounted position of the camera unit 341 being not limited thereto, may be mounted on a rear face of the display and input unit 320, or a plurality of camera units 341 may be mounted. In the case where a plurality of camera units 341 are mounted, the camera unit 341 for imaging may be changed over for singularly imaging, or a plurality of camera units 341 may be simultaneously used for imaging.

The camera unit 341 can be used for the various functions of the smartphone 301. For example, an image obtained by the camera unit 341 may be displayed on the display panel 321, or an image of the camera unit 341 may be used as one of operation input on the operation panel 322. When the GPS reception unit 370 detects a position, the position can be detected by referring an image from the camera unit 341. Further, by referring an image from the camera unit 341, without using the triaxial acceleration sensor or in combination with the triaxial acceleration sensor, an optical axis direction of the camera unit 341 of the smartphone 301 can be determined, and also a current usage environment can be determined. Of course, an image from the camera unit 341 may be used in the application software.

Besides, the image data of the still image or moving image may have added thereto the positional information obtained by the GPS reception unit 370, voice information obtained by the microphone 332 (which may be text information obtained through voice-to-text conversion by the main controller or the like), attitude information obtained by the motion sensor unit 380 and the like, to be stored in the storage unit 350 and be output via the external input/output unit 360 or the radio communication unit 310.

It goes without saying that the present invention is not limited to the embodiments described above and may be modified in the scope without departing from the spirit of the invention.

What is claimed is:

1. An image assessment device assessing an image pair used for three-dimensional measurement from plural captured images comprising:
processing circuitry that:
selects a first captured image from the plural captured images;
acquires an imaging position and imaging orientation of the selected first captured image;
acquires an object distance to be measured from a first imaging position that is the imaging position for the first captured image to an object to be measured in the first captured image;
calculates an object position to be measured which is a position on an optical axis in capturing the first captured image and is at the object distance to be measured in a three-dimensional space from the first imaging position;

selects a second captured image from the plural captured images;
acquires a second imaging position that is an imaging position, imaging orientation, and angle of view for the selected second captured image;
calculates an imaging range corresponding to the second captured image on the basis of the imaging position, imaging orientation, and angle of view for the acquired second captured image; and
determines whether or not the calculated object position to be measured is within the calculated imaging range, and assesses that the first captured image and the second captured image are of the image pair if determining that the calculated object position to be measured is within the calculated imaging range,
wherein the object position to be measured is calculated on the basis of the first captured image and not on the basis of the second captured image,
wherein the imaging range is calculated on the basis of the second captured image and not on the basis of the first captured image, and
wherein the processing circuitry assesses that the first captured image and the second captured image are of the image pair, further in a case a distance between the object position to be measured and the optical axis of a capturing device at the imaging position for the second captured image is equal to or less than a threshold.

2. The image assessment device according to claim 1, wherein processing circuitry assesses that the first captured image and the second captured image are of the image pair, further in a case where a value of a resolving power ΔZ is equal to or less than a threshold, the resolving power ΔZ being expressed by [Formula 1]

$$\Delta Z = \frac{Z^2}{(f/p) \times L} \quad \text{[Formula 1]}$$

including a base length L between a capturing device at the first imaging position and a capturing device at the second imaging position, wherein
ΔZ: resolving power
Z: object distance to be measured
f: focal length
p: pixel pitch of an image pickup device in the capturing device which acquires the captured image
L: base length between the capturing device at the first imaging position and the capturing device at the second imaging position.

3. The image assessment device according to claim 1, wherein, the processing circuitry assesses that the first captured image and the second captured image are of the image pair, further in a case where an angle α formed by the meeting of an optical axis of the capturing device at the first imaging position with a straight line C which connects the capturing device at the first imaging position to the capturing device at the second imaging position, and an angle β formed by the meeting of an optical axis of the capturing device at the second imaging position with the straight line C are both 45° or more and 135° or less.

4. The image assessment device according to claim 1, wherein the processing circuitry assesses that the first captured image and the second captured image are of the image pair, further in a case a distance S between the object position to be measured and the optical axis of the capturing device at the imaging position for the second captured image is equal to or less than a threshold.

5. The image assessment device according to claim 1, wherein the processing circuitry selects a captured image having a value of a resolving power ΔZ equal to or less than a threshold as the second captured image, the resolving power ΔZ being expressed by [Formula 2]

$$\Delta Z = \frac{Z^2}{(f/p) \times Lx} \quad \text{[Formula 2]}$$

including a base length Lx between a capturing device at the first imaging position and a capturing device at an imaging position for a single captured image of the plural captured images, wherein
ΔZ: resolving power
Z: object distance to be measured
f: focal length
p: pixel pitch of an image pickup device in the capturing device which acquires the captured image
Lx: length of a base length between the capturing device at the first imaging position and the capturing device at the imaging position for the single captured image of the plural captured images.

6. The image assessment device according to claim 1, wherein, further in a case where an angle α formed by meeting of an optical axis of the capturing device at the first imaging position with a straight line which connects the capturing device at the first imaging position to the capturing device at the imaging position for the single captured image of the plural captured images, and an angle β formed by meeting of an optical axis of the capturing device at the imaging position for the single captured image of the plural captured images with the straight line are both 45° or more and 135° or less, the processing circuitry selects the single captured image as the second captured image.

7. The image assessment device according to claim 1, wherein further in a case where a distance S between the object position to be measured and the optical axis of the capturing device at the imaging position for the single captured image of the plural captured images is equal to or less than the threshold, the processing circuitry selects the single captured image as the second captured image.

8. The image assessment device according to claim 1, wherein the processing circuitry selects any captured image as the first captured image from the plural captured images, and the processing circuitry selects any captured image of the captured images other than the first captured image as the second captured image from the plural captured images.

9. The image assessment device according to claim 2, further comprising:
a storage device that stores therein a plurality of the image pairs assessed by the assessment device; and
a resolving power optimal pair assessment device that assesses that a pair having the highest resolving power ΔZ is a resolving power optimal pair from a pair group, the pair being included in the pair group in which the first captured image or the second captured image of the image pair is identical in the plurality of the image pairs stored in the storage device.

10. The image assessment device according to claim 4, further comprising:
a storage device that stores therein a plurality of the image pairs assessed by the assessment device; and a distance S optimal pair assessment device that assesses that a pair having the shortest distance S is a distance S optimal pair from a pair group, the pair being included in the pair group in which the first captured image or the second captured image of the image pair is identical in the plural image pairs stored in the storage device.

11. The image assessment device according to claim 9 wherein, the storage device stores as one file the image pair assessed by the assessment device.

12. The image assessment device according to claim 1, wherein the processing circuitry calculates the imaging range shaped in a quadrangular pyramid corresponding to the second captured image on the basis of the imaging position, imaging orientation, and angle of view for the acquired second captured image.

13. A capturing device having the image assessment device according to claim 1.

14. A three-dimensional measuring device performing three-dimensional measurement using the image pair assessed by the image assessment device according to claim 1.

15. An image assessment method for assessing an image pair used for three-dimensional measurement from plural captured images comprising:
- a first captured image selection step for selecting a first captured image from the plural captured images;
- a first captured image information acquisition step for acquiring an imaging position and imaging orientation of the selected first captured image;
- an object distance to-be-measured acquisition step for acquiring an object distance to be measured from a first imaging position that is the imaging position for the first captured image to an object to be measured in the first captured image;
- an object position to-be-measured calculation step for calculating an object position to be measured which is a position on an optical axis in capturing the first captured image and is at the object distance to be measured in a three-dimensional space from the first imaging position;
- a second captured image selection step for selecting a second captured image from the plural captured images;
- a second captured image information acquisition step for acquiring a second imaging position that is an imaging position, imaging orientation, and angle of view for the selected second captured image;
- an imaging range calculation step for calculating an imaging range shaped in a quadrangular pyramid corresponding to the second captured image on the basis of the imaging position, imaging orientation, and angle of view for the acquired second captured image; and
- an assessment step for determining whether or not the calculated object position to be measured is within the calculated imaging range, and assesses that the first captured image and the second captured image are of the image pair if determining that the calculated object position to be measured is within the calculated imaging range, wherein the object position to be measured is calculated on the basis of the first captured image and not on the basis of the second captured image, wherein the imaging range is calculated on the basis of the second captured image and not on the basis of the first captured image, and wherein the first captured image and the second captured image are of the image pair, further in a case a distance between the object position to be measured and the optical axis of a capturing device at the imaging position for the second captured image is equal to or less than a threshold.

16. A non-transitory computer-readable medium recording a program for assessing an image pair used for three-dimensional measurement from plural captured images, the program causing a computer to execute:
- a first captured image selection step for selecting a first captured image from the plural captured images;
- a first captured image information acquisition step for acquiring an imaging position and imaging orientation of the selected first captured image;
- an object distance to-be-measured acquisition step for acquiring an object distance to be measured from a first imaging position that is the imaging position for the first captured image to an object to be measured in the first captured image;
- an object position to-be-measured calculation step for calculating an object position to be measured which is a position on an optical axis in capturing the first captured image and is at the object distance to be measured in a three-dimensional space from the first imaging position;
- a second captured image selection step for selecting a second captured image from the plural captured images;
- a second captured image information acquisition step for acquiring a second imaging position that is an imaging position, imaging orientation, and angle of view for the selected second captured image;
- an imaging range calculation step for calculating an imaging range shaped in a quadrangular pyramid corresponding to the second captured image on the basis of the imaging position, imaging orientation, and angle of view for the acquired second captured image; and
- an assessment step for determining whether or not the calculated object position to be measured is within the calculated imaging range, and assesses that the first captured image and the second captured image are of the image pair if determining that the calculated object position to be measured is within the calculated imaging range, wherein the object position to be measured is calculated on the basis of the first captured image and not on the basis of the second captured image, wherein the imaging range is calculated on the basis of the second captured image and not on the basis of the first captured image, and wherein the first captured image and the second captured image are of the image pair, further in a case a distance between the object position to be measured and the optical axis of a capturing device at the imaging position for the second captured image is equal to or less than a threshold.

* * * * *